US009573420B2

(12) United States Patent
Hedley et al.

(10) Patent No.: US 9,573,420 B2
(45) Date of Patent: Feb. 21, 2017

(54) HANDLING DEVICE AND METHODS

(75) Inventors: Robert Ian Hedley, Buttaba (AU);
Christopher Nash Whybin, Newstead (AU)

(73) Assignee: Justoy Pty Limited, Mount Thorley Via Singleton, NSW (AU)

( * ) Notice: Subject to any disclaimer, the term of this patent is extended or adjusted under 35 U.S.C. 154(b) by 216 days.

(21) Appl. No.: 14/118,122

(22) PCT Filed: May 17, 2012

(86) PCT No.: PCT/AU2012/000547
§ 371 (c)(1),
(2), (4) Date: Jan. 16, 2014

(87) PCT Pub. No.: WO2012/155207
PCT Pub. Date: Nov. 22, 2012

(65) Prior Publication Data
US 2014/0314536 A1 Oct. 23, 2014

Related U.S. Application Data

(60) Provisional application No. 61/487,188, filed on May 17, 2011.

(30) Foreign Application Priority Data

May 17, 2011 (AU) ................................ 2011901901

(51) Int. Cl.
*B60B 30/10* (2006.01)
*B66F 7/26* (2006.01)
(Continued)

(52) U.S. Cl.
CPC ............... *B60B 30/10* (2013.01); *B60B 29/00* (2013.01); *B60B 30/02* (2013.01); *B62B 3/04* (2013.01); *B62B 3/104* (2013.01); *B65G 7/04* (2013.01); *B65G 7/08* (2013.01); *B66F 7/22* (2013.01); *B66F 7/26* (2013.01); *B66F 9/065* (2013.01); *B62B 5/0026* (2013.01); *B62B 2202/031* (2013.01)

(58) Field of Classification Search
CPC ............................... B60B 29/002; B60B 30/10
See application file for complete search history.

(56) References Cited

U.S. PATENT DOCUMENTS 1,523,486 A    1/1925   Manley
2,379,587 A *   7/1945   Moore .................. B60B 29/002
                                                                        414/427

(Continued)

OTHER PUBLICATIONS

International Search Report and Written Opinion of PCT/AU2012/000547 mailed on Jun. 27, 2012, 13 pages.

*Primary Examiner* — Jonathan Snelting
(74) *Attorney, Agent, or Firm* — Kilpatrick Townsend & Stockton LLP

(57) ABSTRACT

An article handling apparatus including a frame adapted to receive the article on a support structure, a number of wheels attached to the frame for movement of the frame over a substrate surface, and retaining arms operatively coupled to the frame and adapted to releasably secure the article to the frame. The secured article is movable in a controlled manner with respect to the frame by movement of the support structure and the retaining arms.

19 Claims, 31 Drawing Sheets

(51) Int. Cl.
*B66F 9/065* (2006.01)
*B60B 29/00* (2006.01)
*B60B 30/02* (2006.01)
*B62B 3/10* (2006.01)
*B62B 3/04* (2006.01)
*B65G 7/04* (2006.01)
*B65G 7/08* (2006.01)
*B66F 7/22* (2006.01)
*B62B 5/00* (2006.01)

(56) References Cited

U.S. PATENT DOCUMENTS

| | | | |
|---|---|---|---|
| 2,583,216 A | | 1/1952 | Hoffman |
| 2,852,151 A | | 9/1958 | Smith |
| 3,828,953 A | * | 8/1974 | Reznicek ............. B66F 5/04 414/428 |
| 3,830,388 A | * | 8/1974 | Mott ............. B60B 29/002 414/427 |
| 3,937,343 A | * | 2/1976 | Spulak ............. B60B 29/002 414/428 |
| 4,401,405 A | | 8/1983 | Ealet |
| 4,460,306 A | | 7/1984 | Hawkins |
| 7,677,582 B2 | * | 3/2010 | Hedley ............. B60B 29/002 280/79.11 |
| 2007/0290179 A1 | | 12/2007 | Hedley et al. |
| 2009/0155032 A1 | * | 6/2009 | Hedley ............. B60B 29/002 414/426 |

\* cited by examiner

HANDLING DEVICE AND METHODS

BACKGROUND OF THE INVENTION

The present invention relates to an article handling apparatus. In particular, the present invention relates to an apparatus for transporting an article, such as, but not limited to a wheel or other spare part, and for handling the article in a replacement or installation process. The invention has particular application in the mining and earthmoving fields.

DESCRIPTION OF THE PRIOR ART

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

Large earthmoving vehicles, for example those used in mining, typically have correspondingly large tyres. Replacing these oversized tyres can be an onerous task requiring multiple staff, and in most cases, the assistance of bulky machinery that is often difficult to manoeuvre within the workshop or other space-limited environment. Such lifting equipment is generally not compact and easily transportable.

SUMMARY OF THE INVENTION

The present invention seeks to provide an article handling device for handling articles such as tyres or other spare parts, within a workshop environment or other confined space where a small device foot print is required.

In one broad form the present invention provides, an article handling apparatus including:
  a frame adapted to receive the article on a support means;
  a plurality of wheels attached to said frame for movement of said frame over a substrate surface; and
  at least one retaining arm operatively coupled to the frame and adapted to releasably secure the article to the frame,
  wherein the secured article is movable in a controlled manner with respect to the frame by movement of the support means and the retaining arm.

In one form the support means includes a pair of supporting arms extending from the frame.

In one form, the article handling apparatus includes a plurality of retaining arms.

In a further the retaining arms extend substantially upwardly from the frame and claw-like end portions of the retaining arms are configured to extend over the article and clamp the article securely to the frame.

In one form, the claw-like end portions are retractable or rotatable to permit the article to be removed.

In one form, the retaining arms are hingedly connected to the frame.

In one form, the retaining arms are adapted to tilt relative to the frame.

In one form, the retaining arms are adjustable to accommodate articles of different sizes.

In one form, the apparatus includes three wheels.

In one form, the apparatus includes two front wheels and a rear wheel, the rear wheel being movable independent of the two front wheels.

In one form, the retaining arms and/or the supporting arms include rollers to allow rotation of the secured article.

In a further form the article handling apparatus includes at least one tilting arm operatively coupled to the rear wheel, the tilting arm operating to tilt the secured article forward and rearward.

In one form the article handling apparatus is configured to handle a tyre.

In a further form the retaining arm to contactingly engages both walls of the tyre to securely clamp the tyre.

In a further form the rollers contact the tyre tread to rotate the tyre.

BRIEF DESCRIPTION OF THE DRAWINGS

Examples of the present invention will now be described with reference to the accompanying drawings, in which.

DETAILED DESCRIPTION OF PREFERRED EMBODIMENTS

Figure 1:
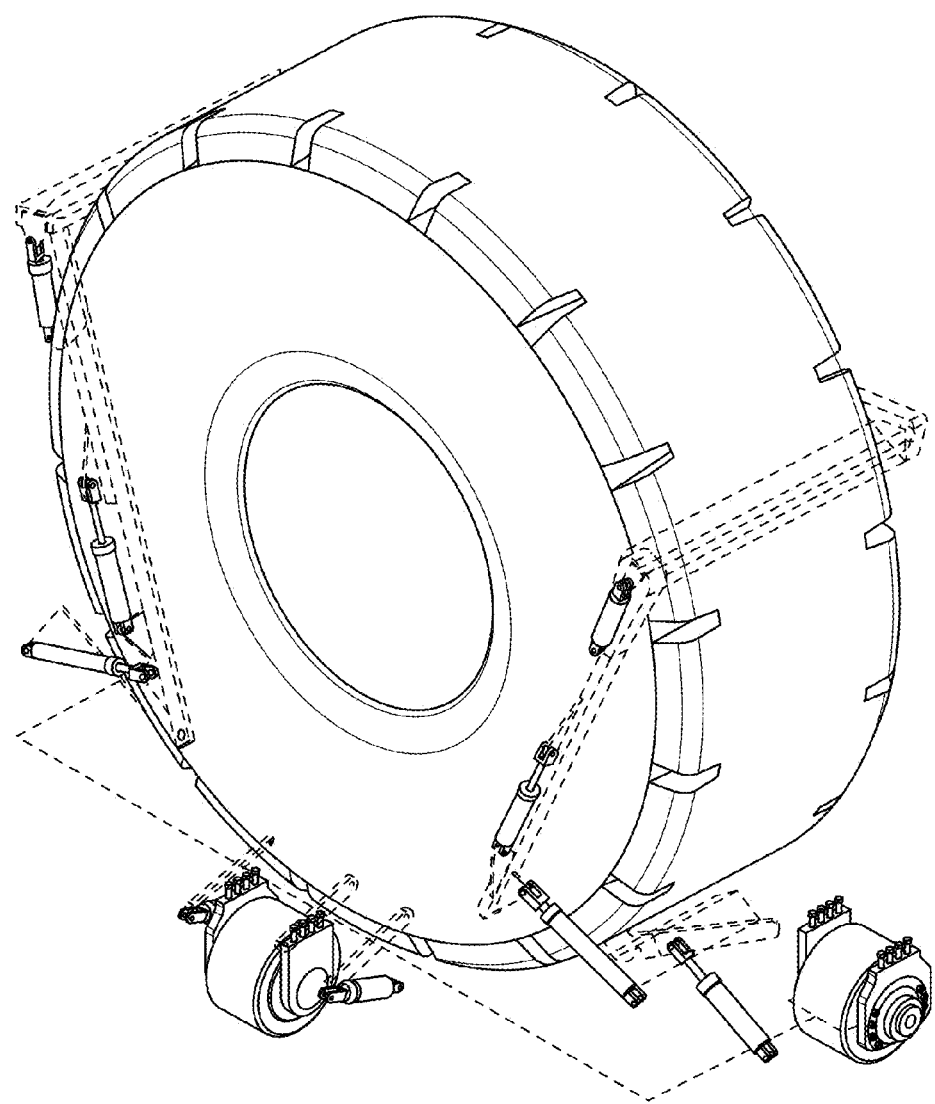
FIG. 1 is a perspective view of one example of the article handling apparatus handling a large tyre (frame not shown)
Figure 2:
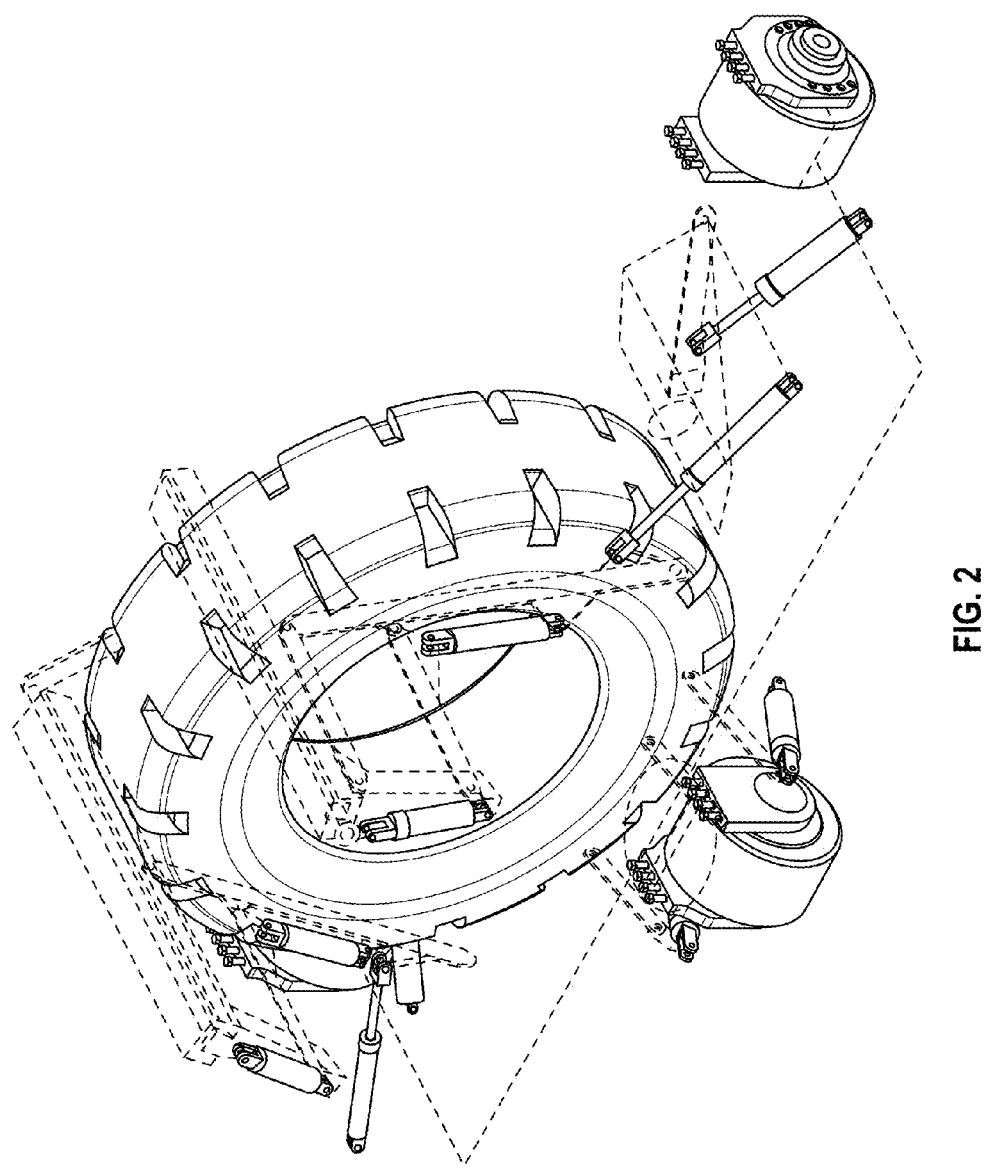
FIG. 2 is perspective view of one example of the article handling apparatus handling a small tyre (frame not shown.

Throughout the drawings, like numerals will be used to identify similar features, except where expressly otherwise indicated.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

Embodiments of the present invention provide an article handling apparatus including frame adapted to receive the article on a support means. A plurality of wheels are attached to the frame for movement of the frame over a substrate surface. At least one retaining arm is operatively coupled to the frame and adapted to releasably secure the article to the frame. The secured article is movable in a controlled manner with respect to the frame by movement of the support means and the retaining arm.

One embodiment of certain aspects of the invention is shown by the article handling apparatus (1) illustrated in FIGS. 1 to 6, but without the frame of the apparatus, for ease of understanding the other components. An embodiment of the invention, including the frame, is then shown in FIGS. 17 to 32.

In the embodiment shown, the article (7) being handled is a tyre. The article handling apparatus (1) includes a support means in the form of a pair of supporting arms (2) extending from a frame (3).

Two retaining arms (4) extend substantially upwardly from the frame (3) and claw-like end portions (5) of the retaining arms (4) are configured to extend over the article (7) and clamp the article (7) securely to the frame (3).

The claw-like end portions (5) are retractable to permit the article to be removed. The claw-like end portions (5) span the tyre width to provide opposing clamp support to upright portions (8) of the retaining arms. The span length (9) of the claw-like end portions (5) is adjustable to accommodate tyres of different sizes and may be controlled on each side by a set of parallel arms (15) attached to a hydraulic cylinder. As these parallel arms (15) rotate the horizontal portion of the claw portion (10) extend both upwards and inwards towards the tyre.

Figure 12:
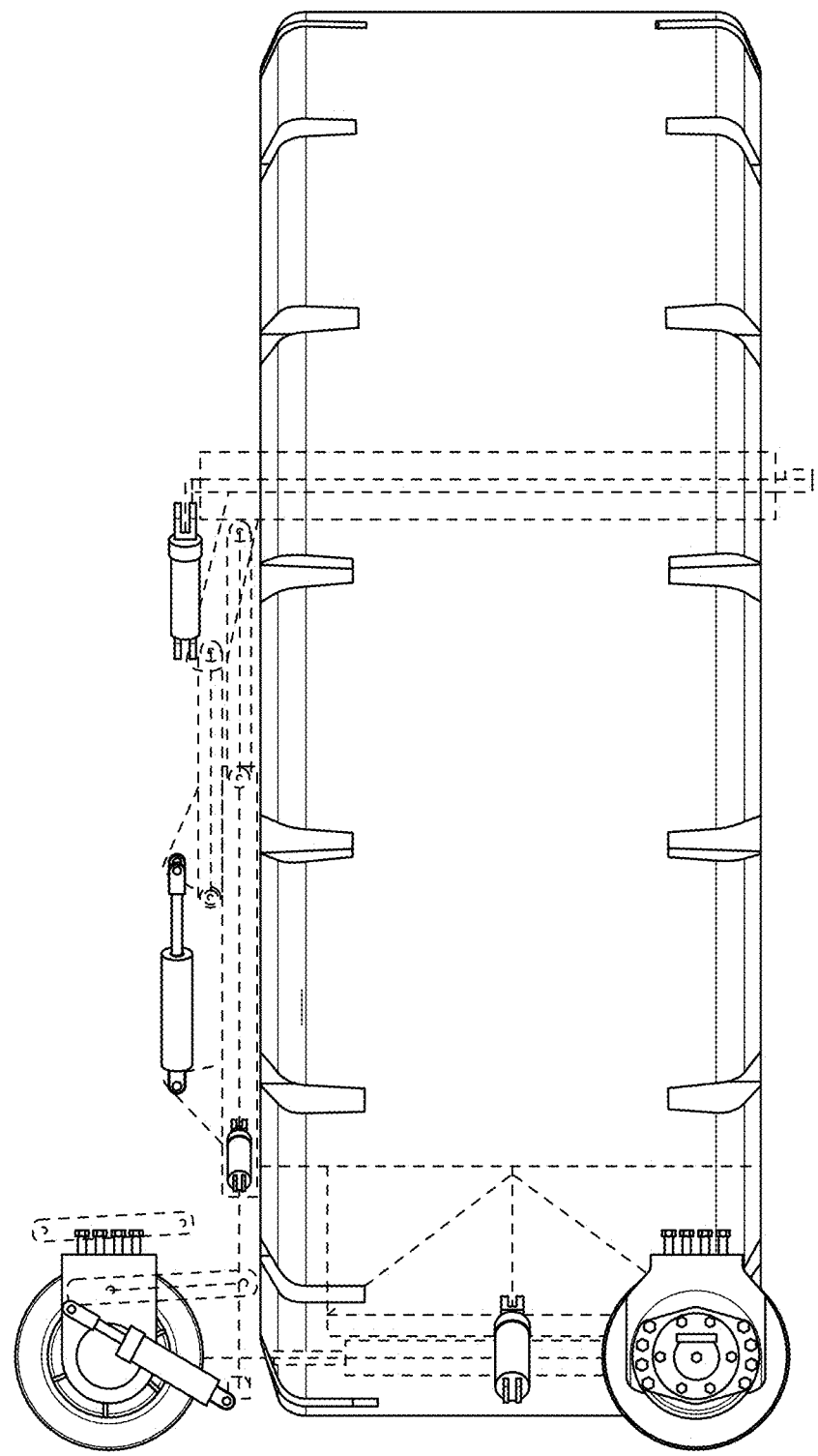
FIG. 12 is a side view of one example of the article handling apparatus handling a large tyre.
Figure 13:
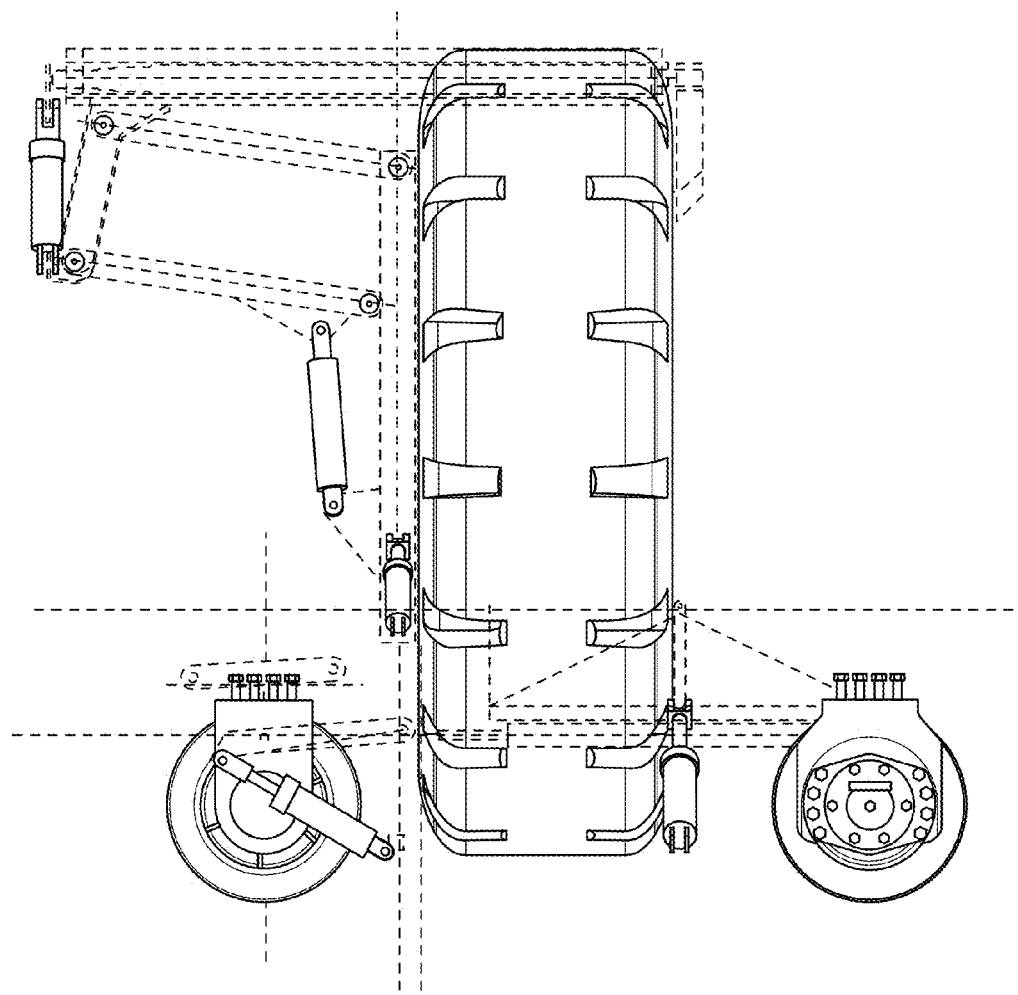
FIG. 13 is a side view of one example of the article handling apparatus handling a small tyre.

This extension in length also gives a wide range of higher clamping positions for the larger tyres. FIG. 12 shows the claw spanning a larger tyre whilst FIG. 13 shows the claw-like portions spanning a relatively smaller tyre.

Figure 14:
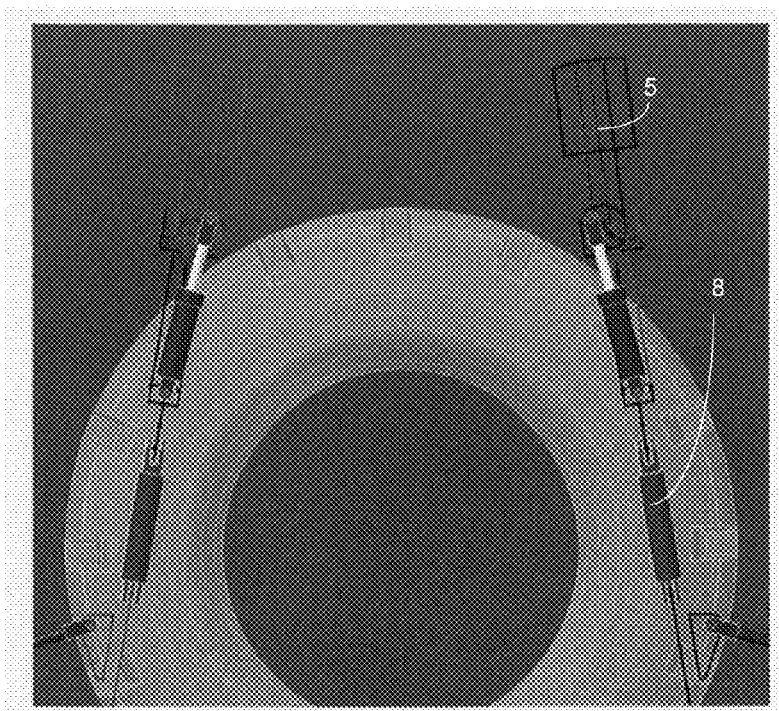
FIG. 14 is a rear view of one example of the article handling apparatus having claw-like end portions retracted.
Figure 15:
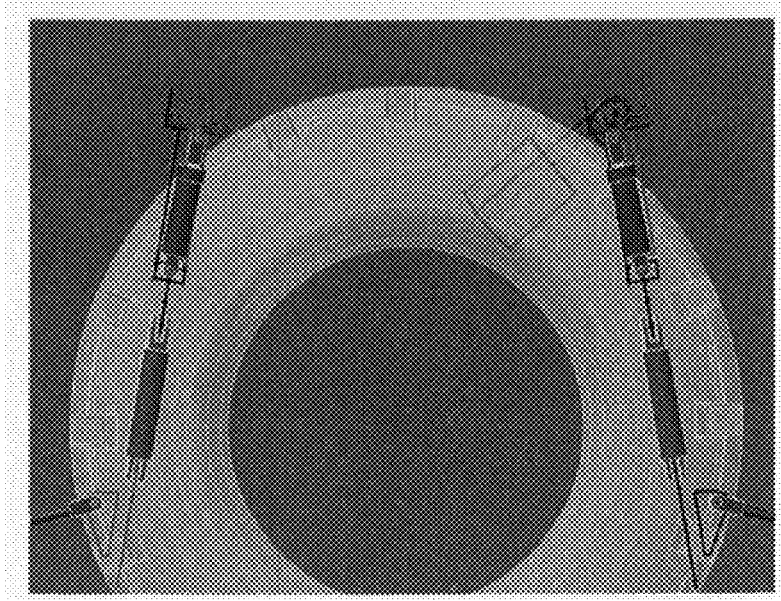
FIG. 15 is a rear view of one example of the article handling apparatus with claw-like end portion extended and securing a tyre.
Figure 16:
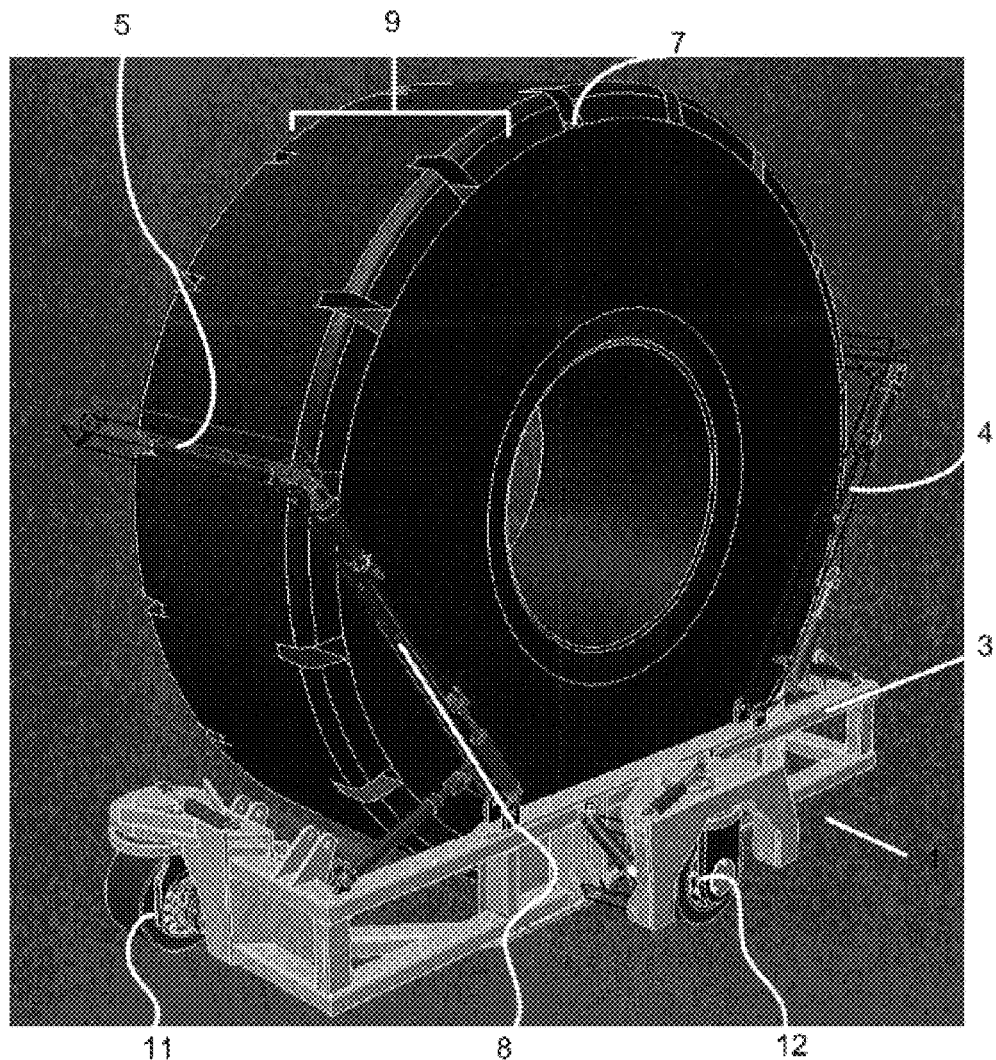
FIG. 16 is perspective view of one example of the article handling apparatus.
Figure 17:
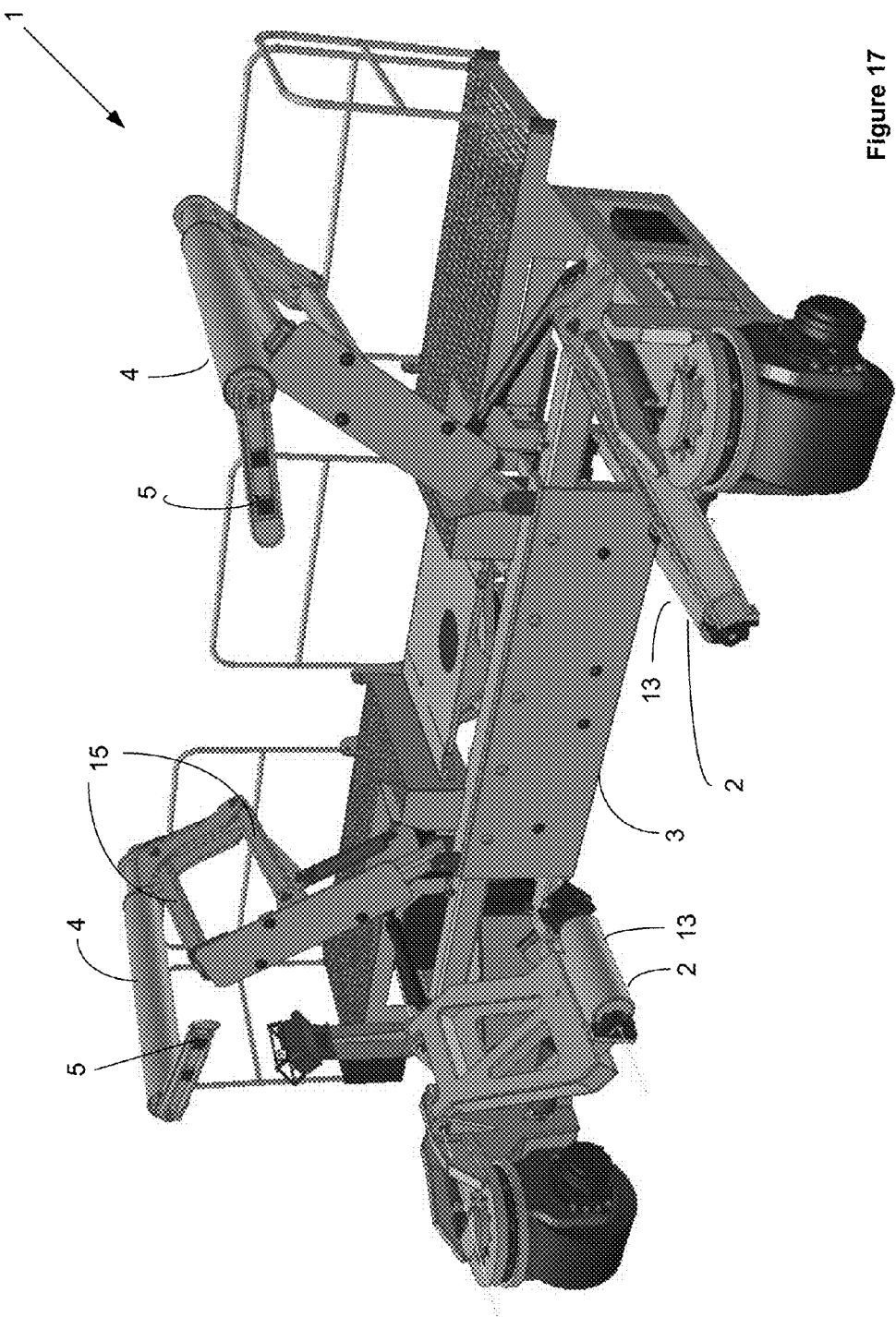
FIG. 17 shows a front perspective view of a preferred embodiment of the article handling apparatus in accordance with the present invention.
Figure 18:
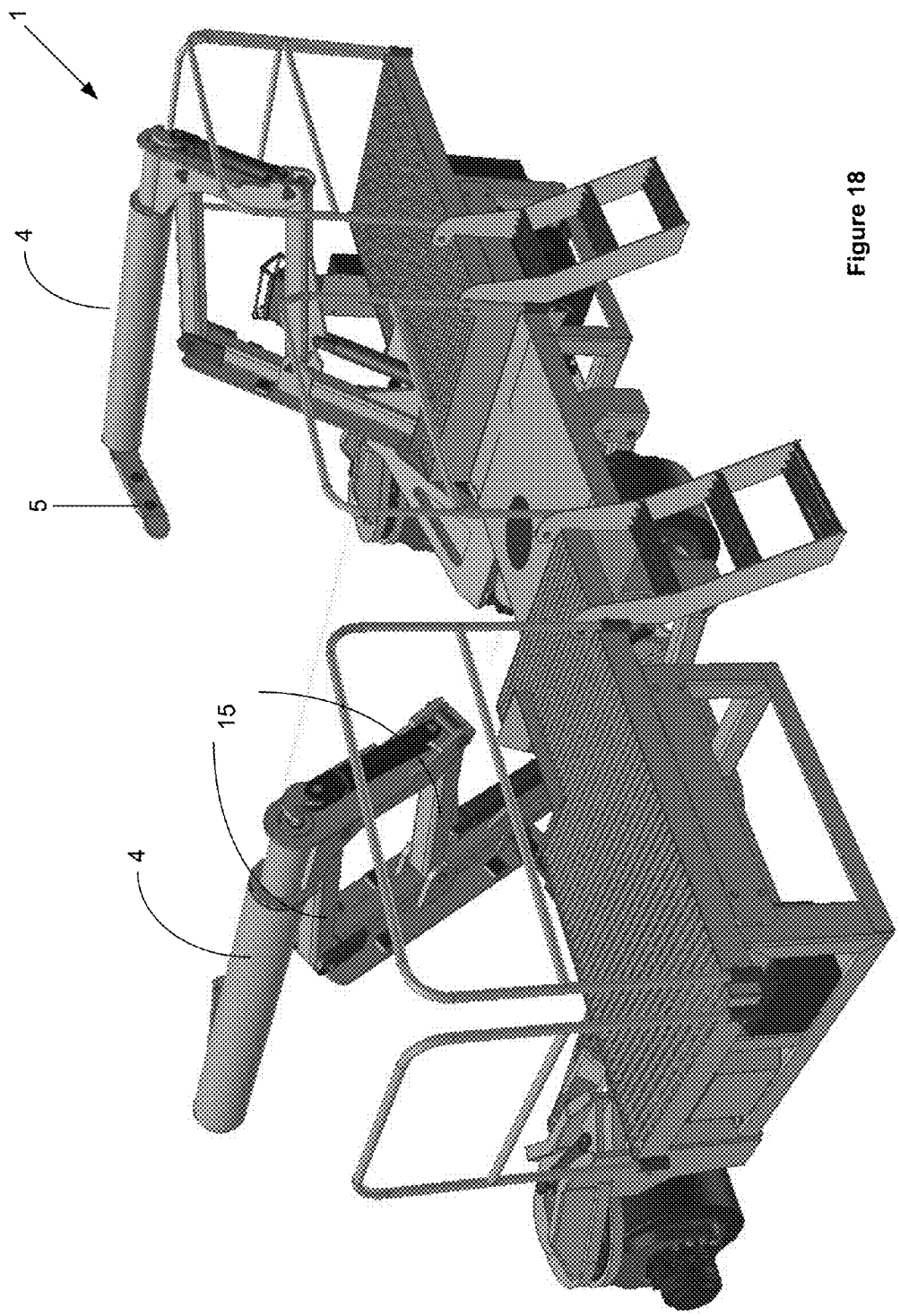
FIG. 18 illustrates a rear perspective view of the embodiment shown in FIG. 17.
Figure 19:
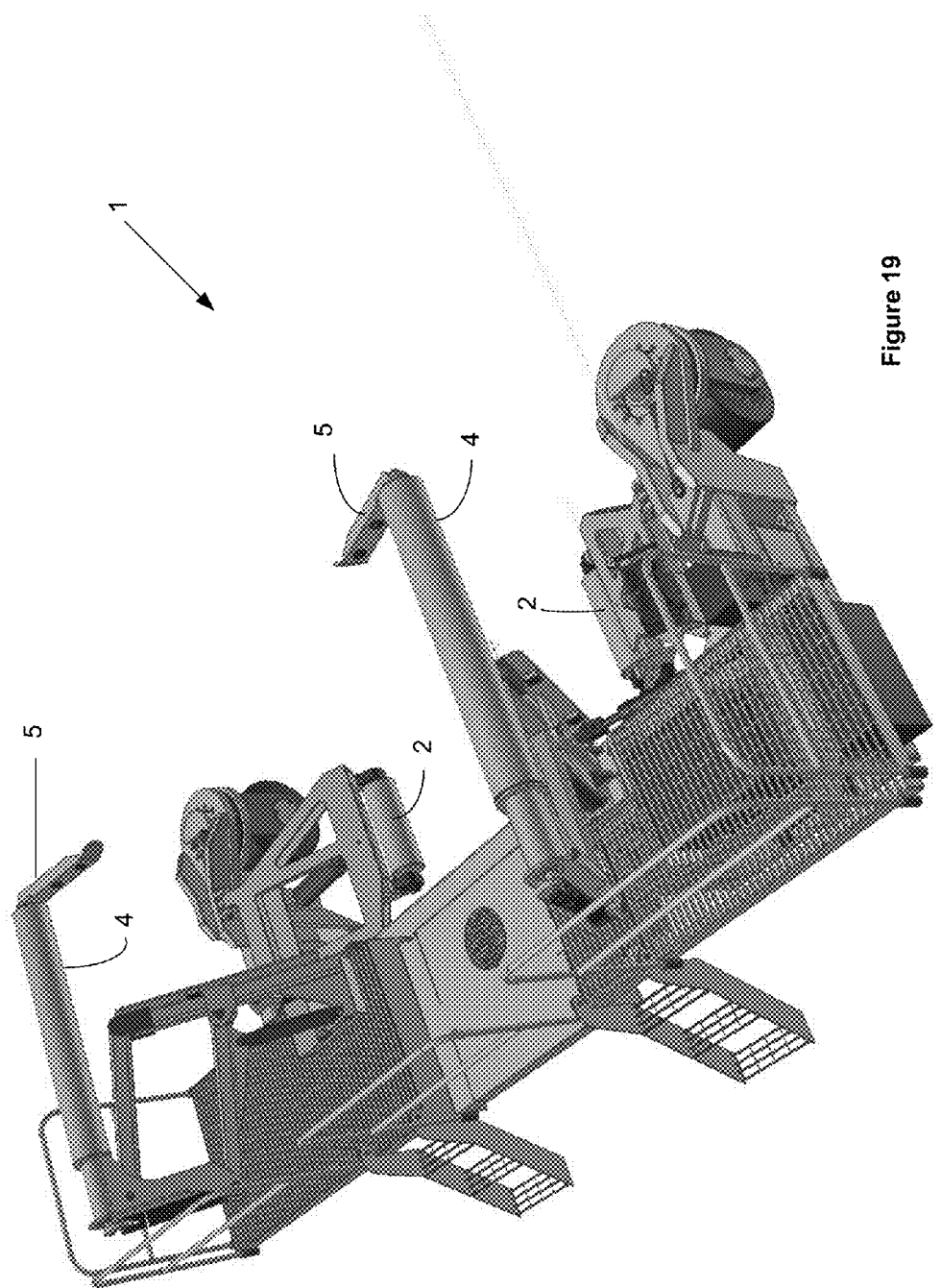
FIG. 19 shows an alternative rear perspective view of the embodiment illustrated in FIG. 17.
Figure 20:
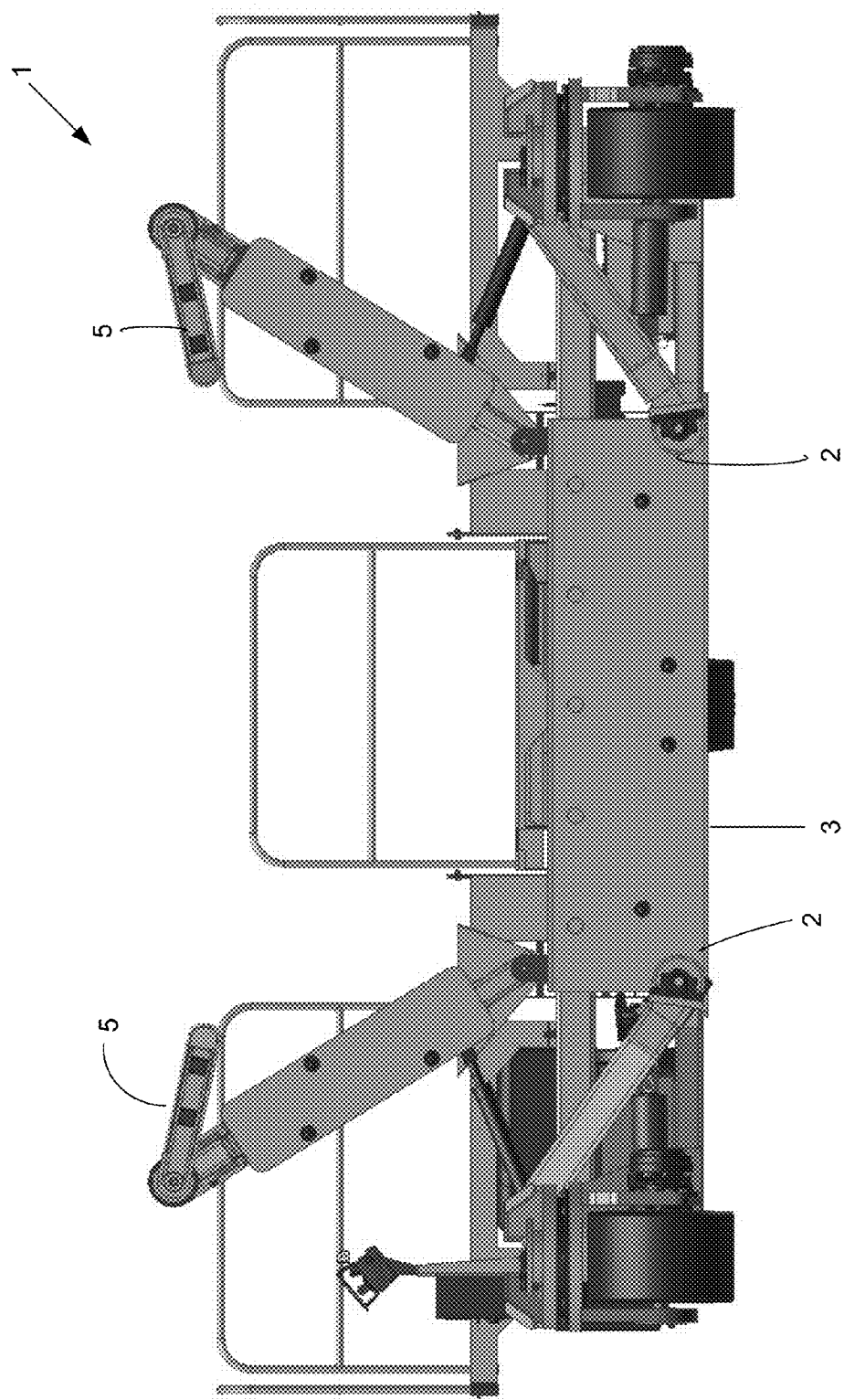
FIG. 20 shows a front view of the embodiment illustrated in FIG. 17.
Figure 21:
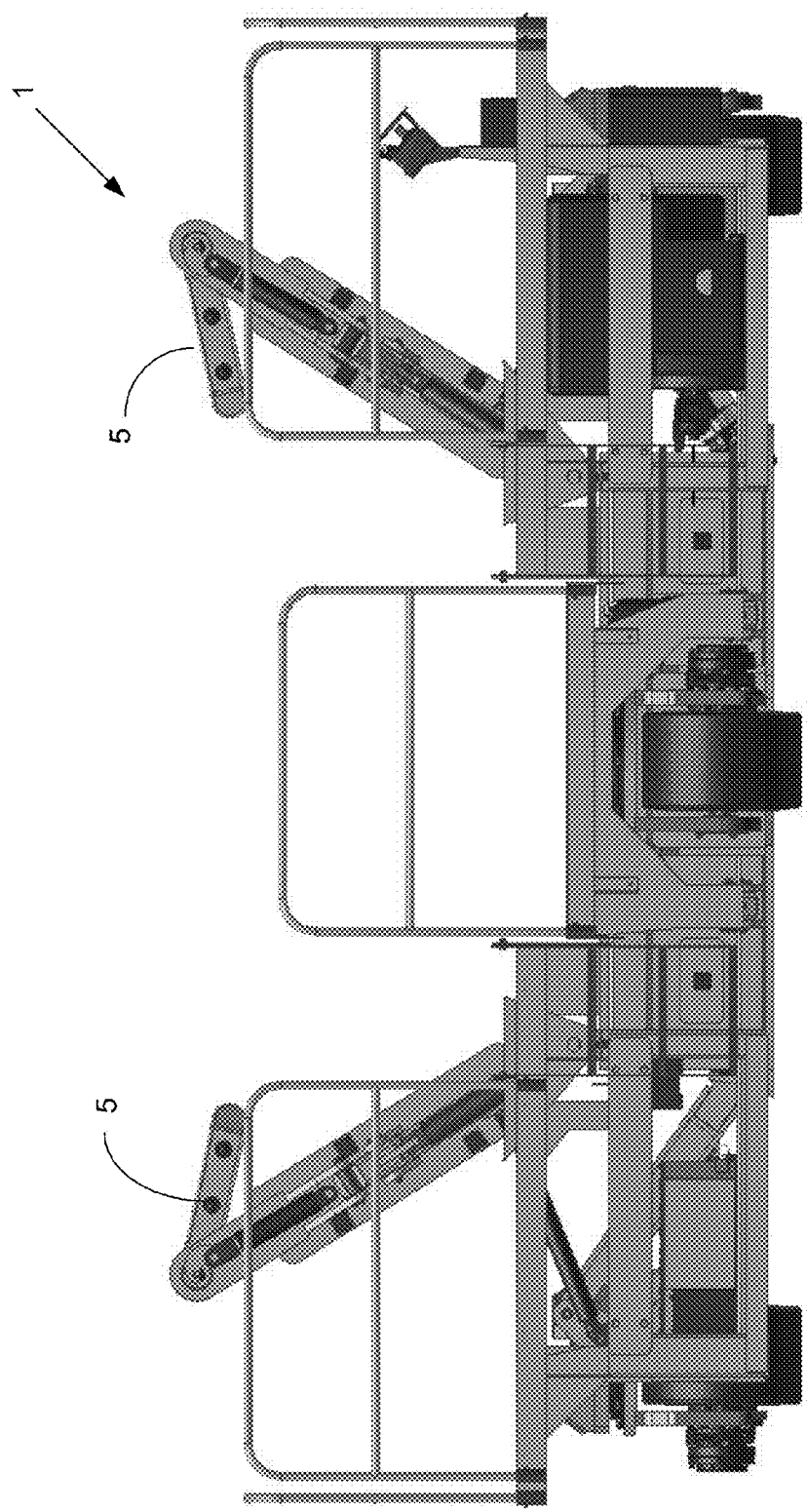
FIG. 21 illustrates a rear view of the embodiment shown in FIG. 17.
Figure 22:
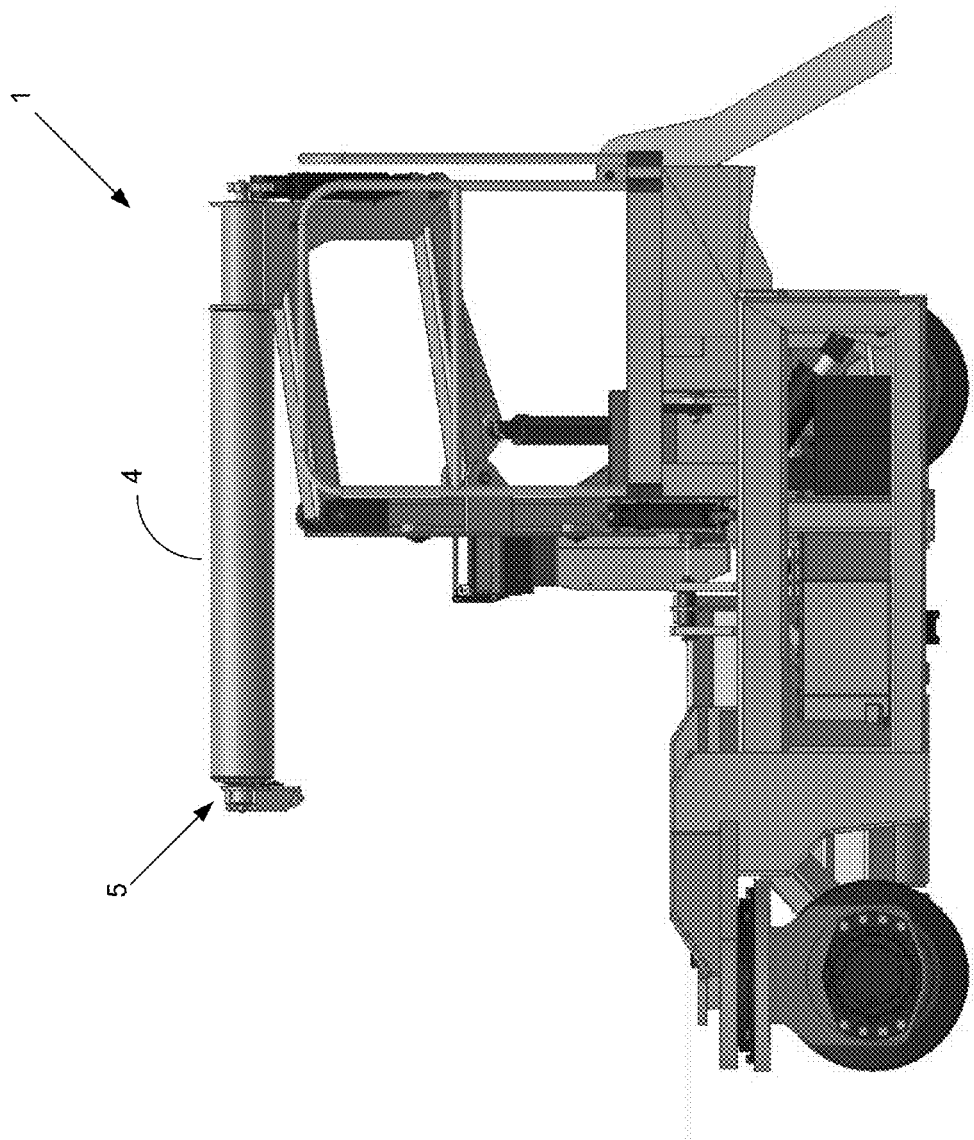
FIG. 22 illustrates a side view of the embodiment shown in FIG. 17.
Figure 23:
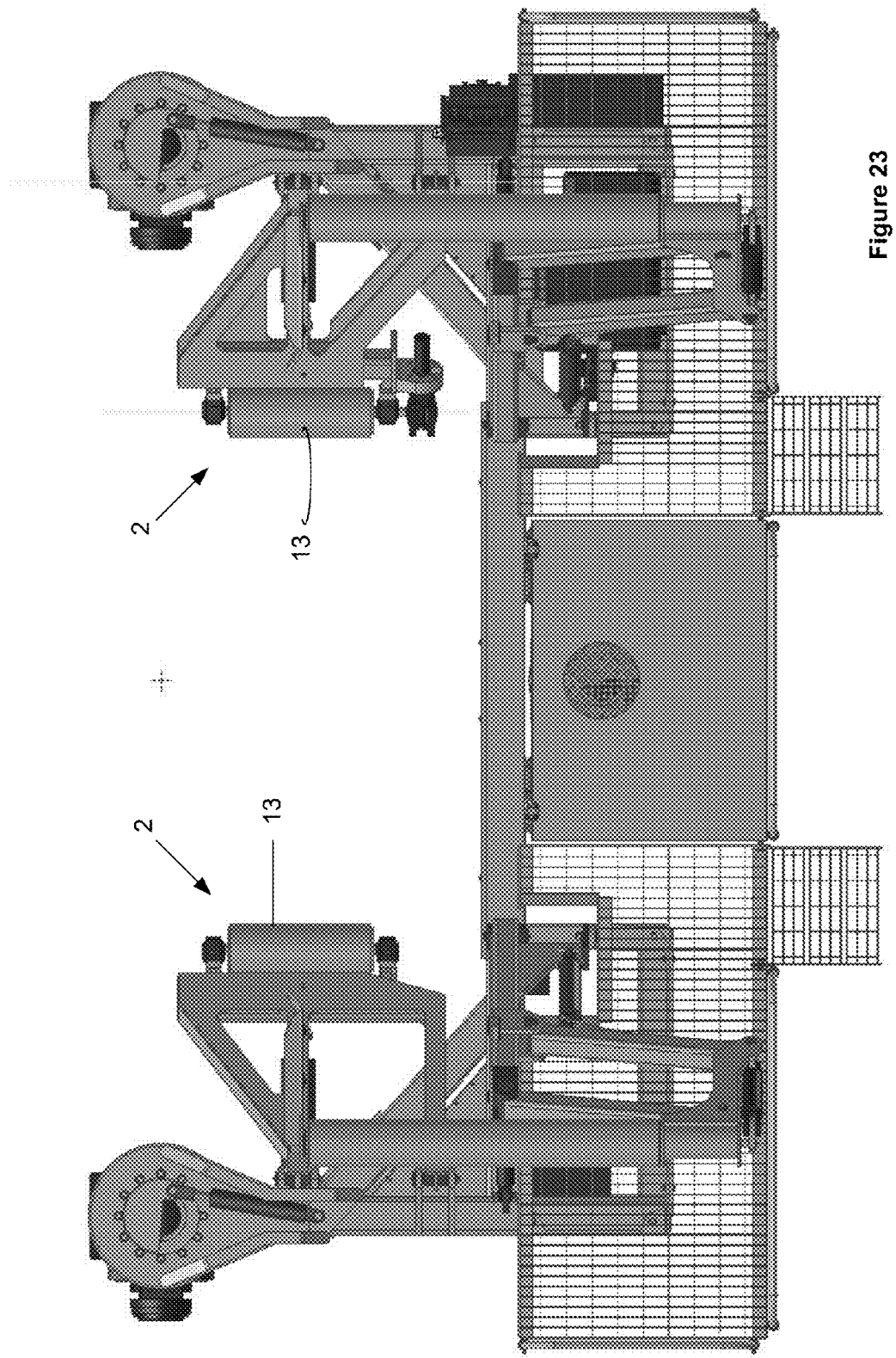
FIG. 23 illustrates a top view of the embodiment shown in FIG. 17.
Figure 24:
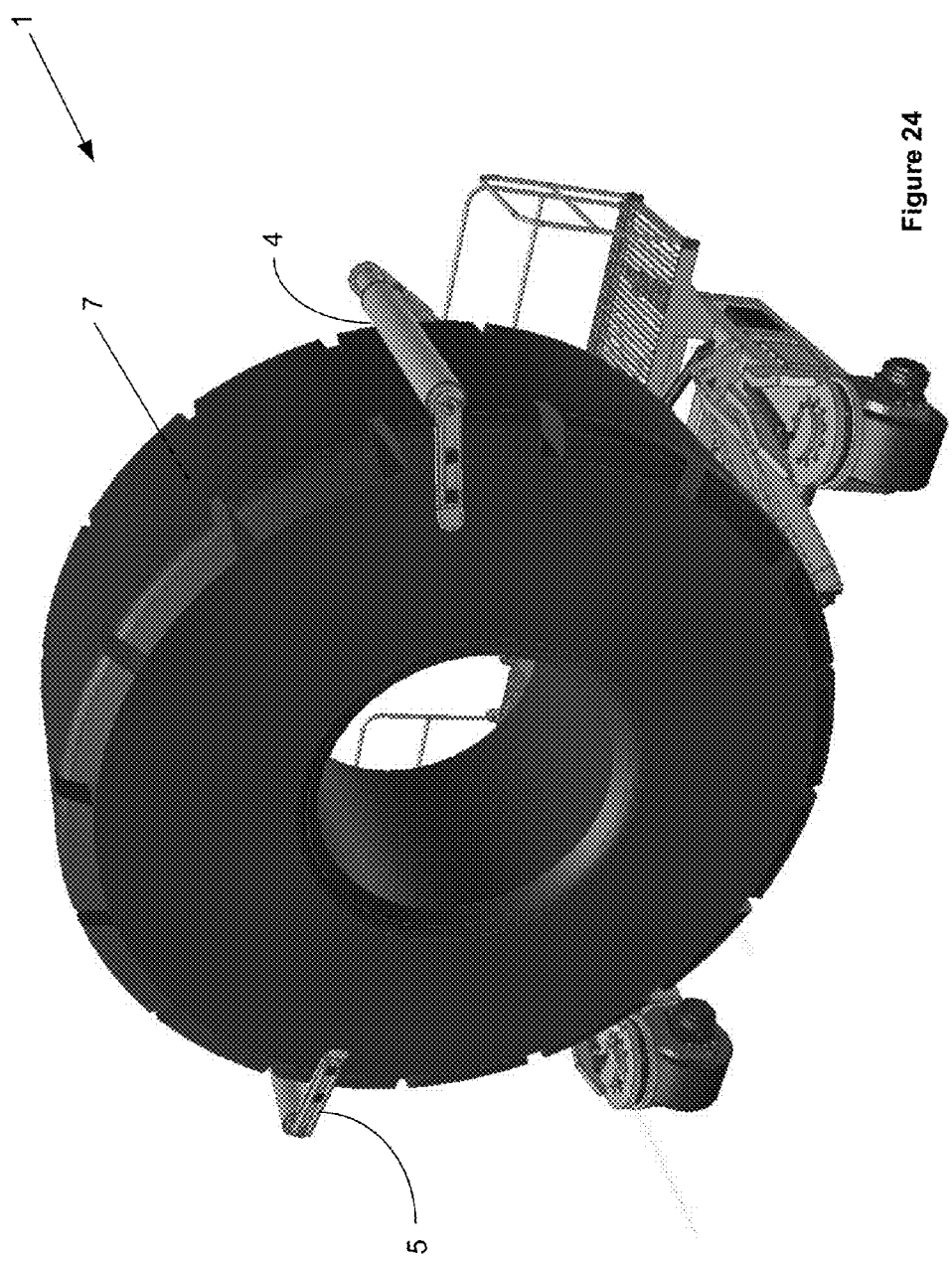
FIG. 24 illustrates a front perspective view of the article handling apparatus, shown in the embodiments illustrated in FIGS. 17 to 23, but with a large tyre shown being handled by the apparatus.
Figure 25:
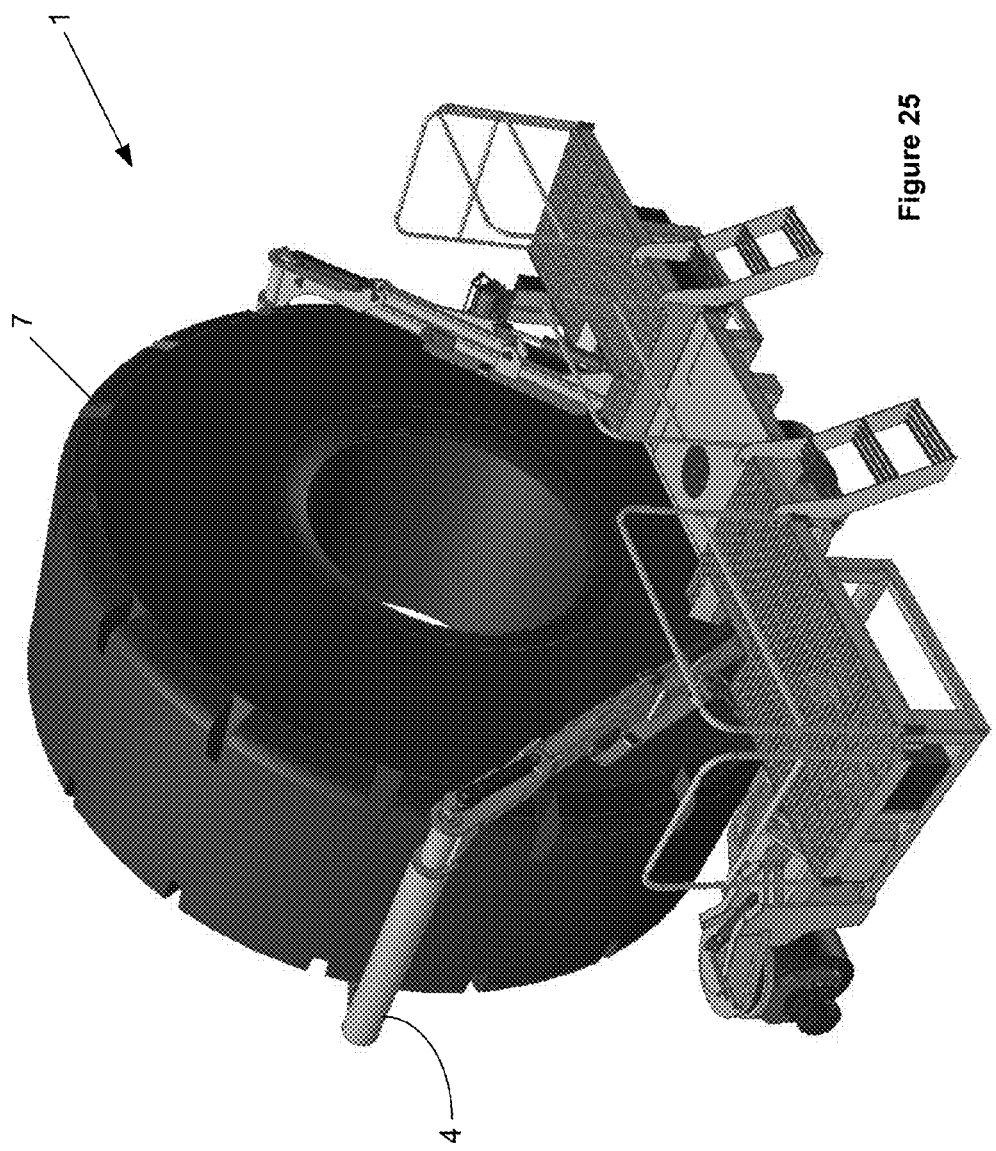
FIG. 25 shows a rear perspective view of the apparatus shown in FIG. 24.
Figure 26:
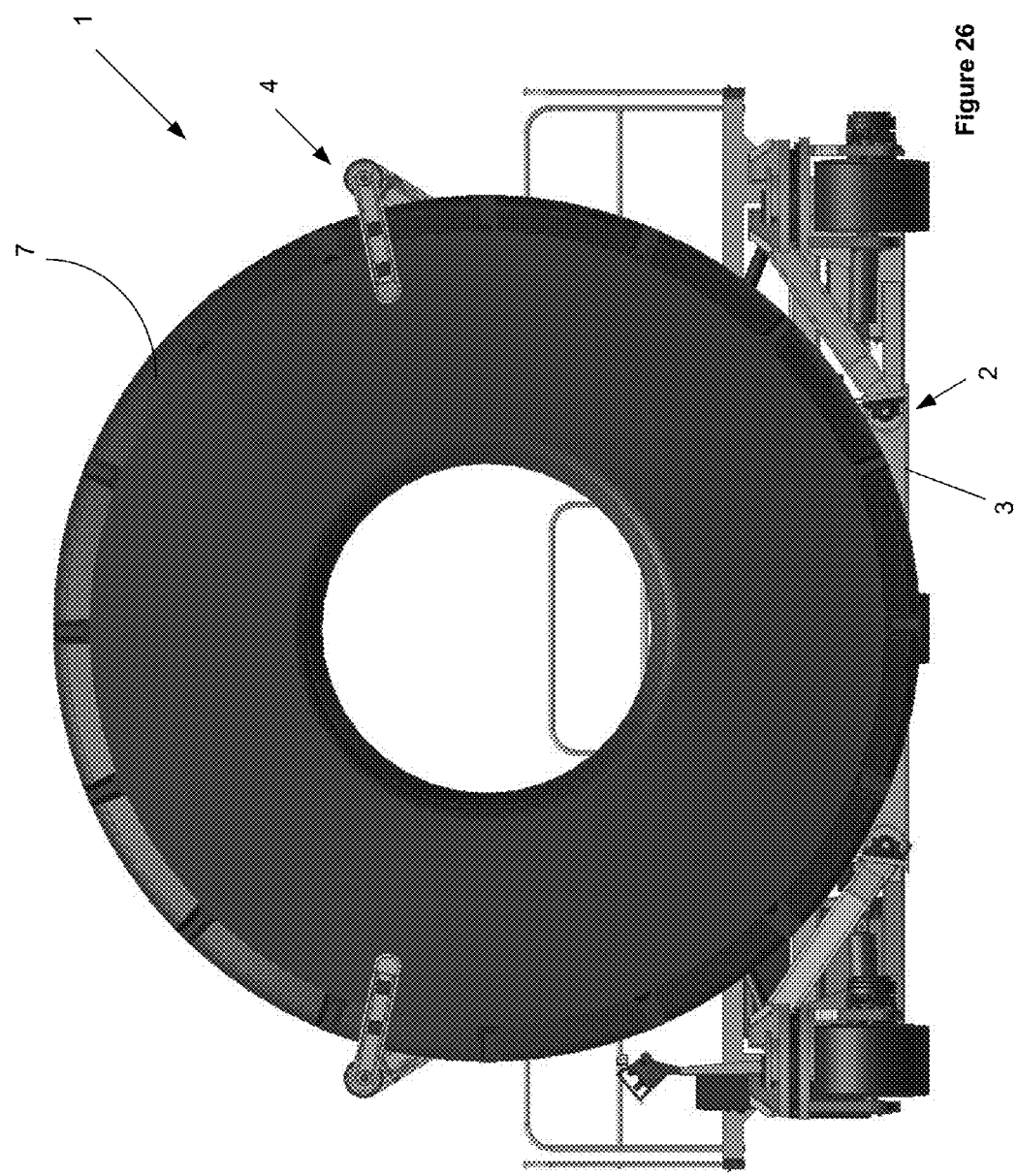
FIG. 26 shows a front perspective view of the apparatus shown in FIG. 24.
Figure 27:
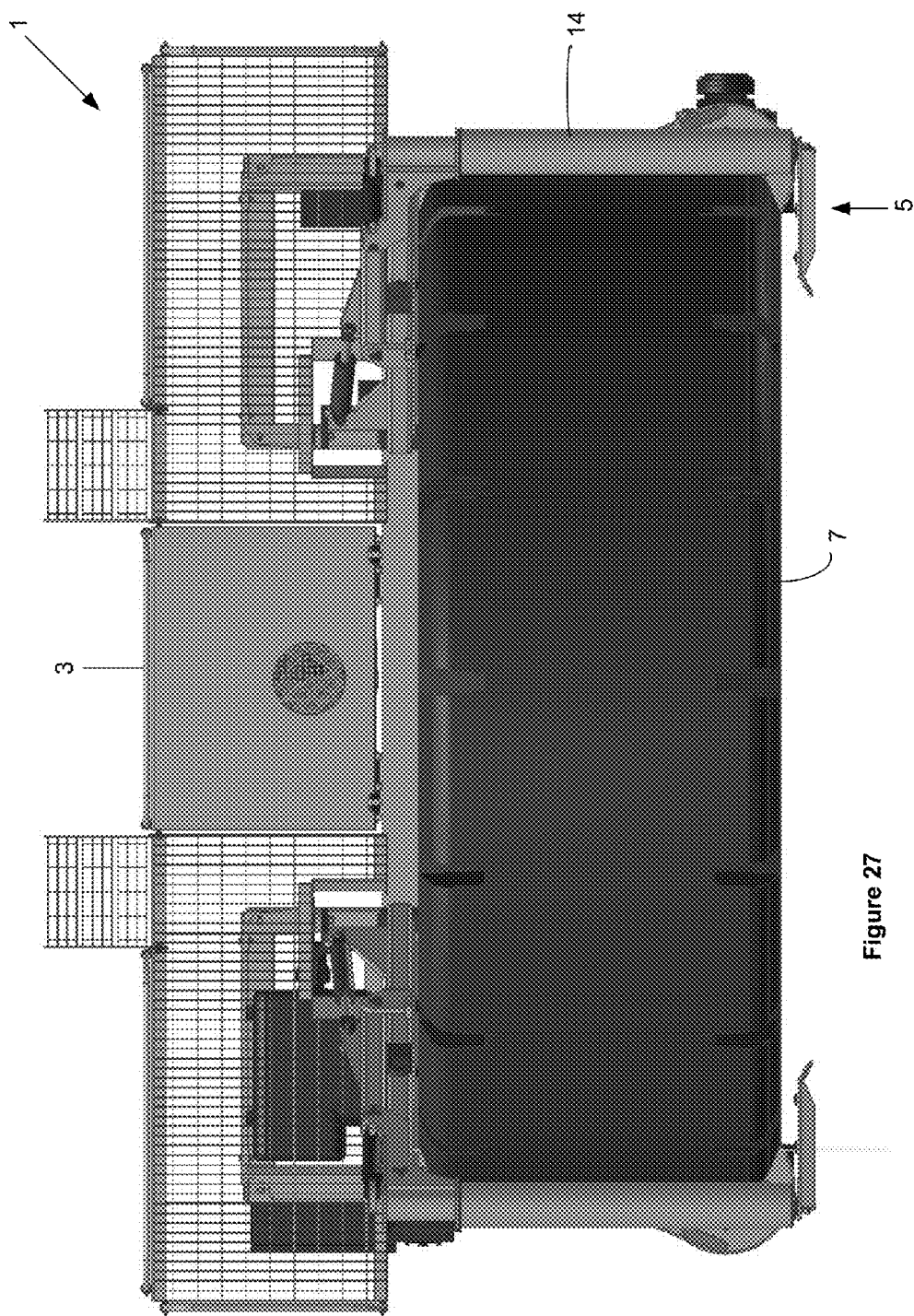
FIG. 27 illustrates a top view of the apparatus shown in FIG. 24.
Figure 28:
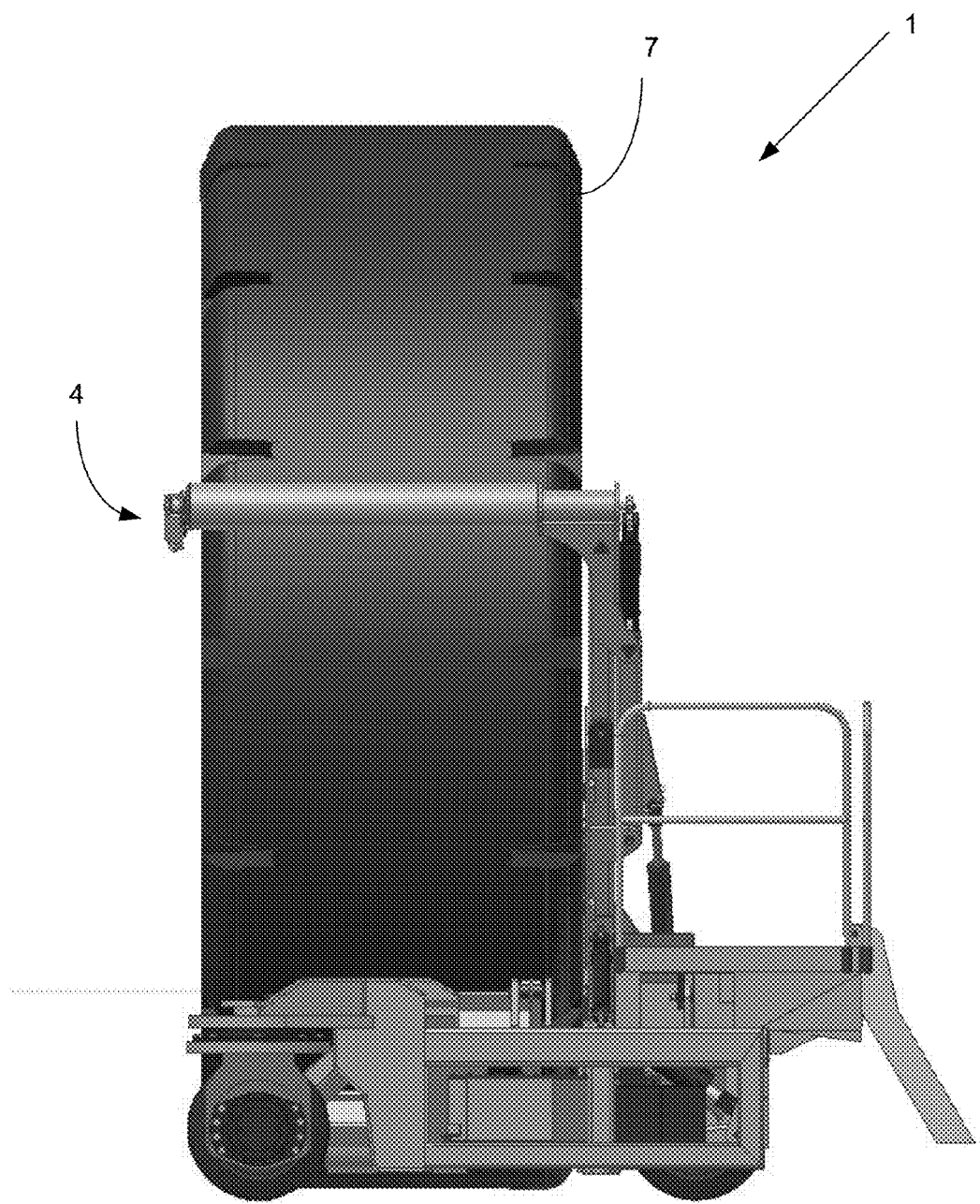
FIG. 28 illustrates a side elevational view of the apparatus shown in FIG. 24.
Figure 29:
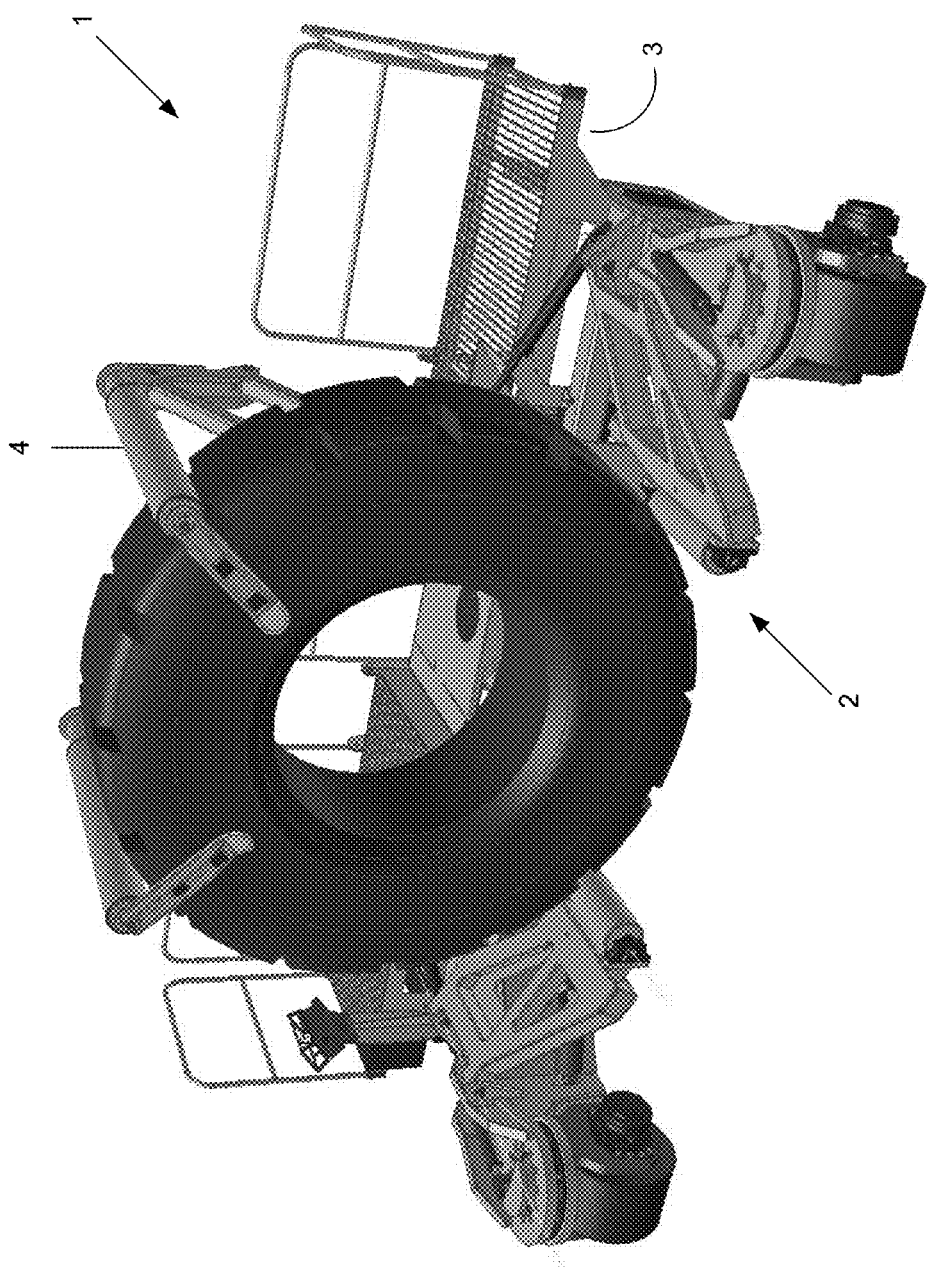
FIG. 29 illustrates a smaller tyre being handled by the article handling apparatus of FIGS. 17 and 24.
Figure 30:
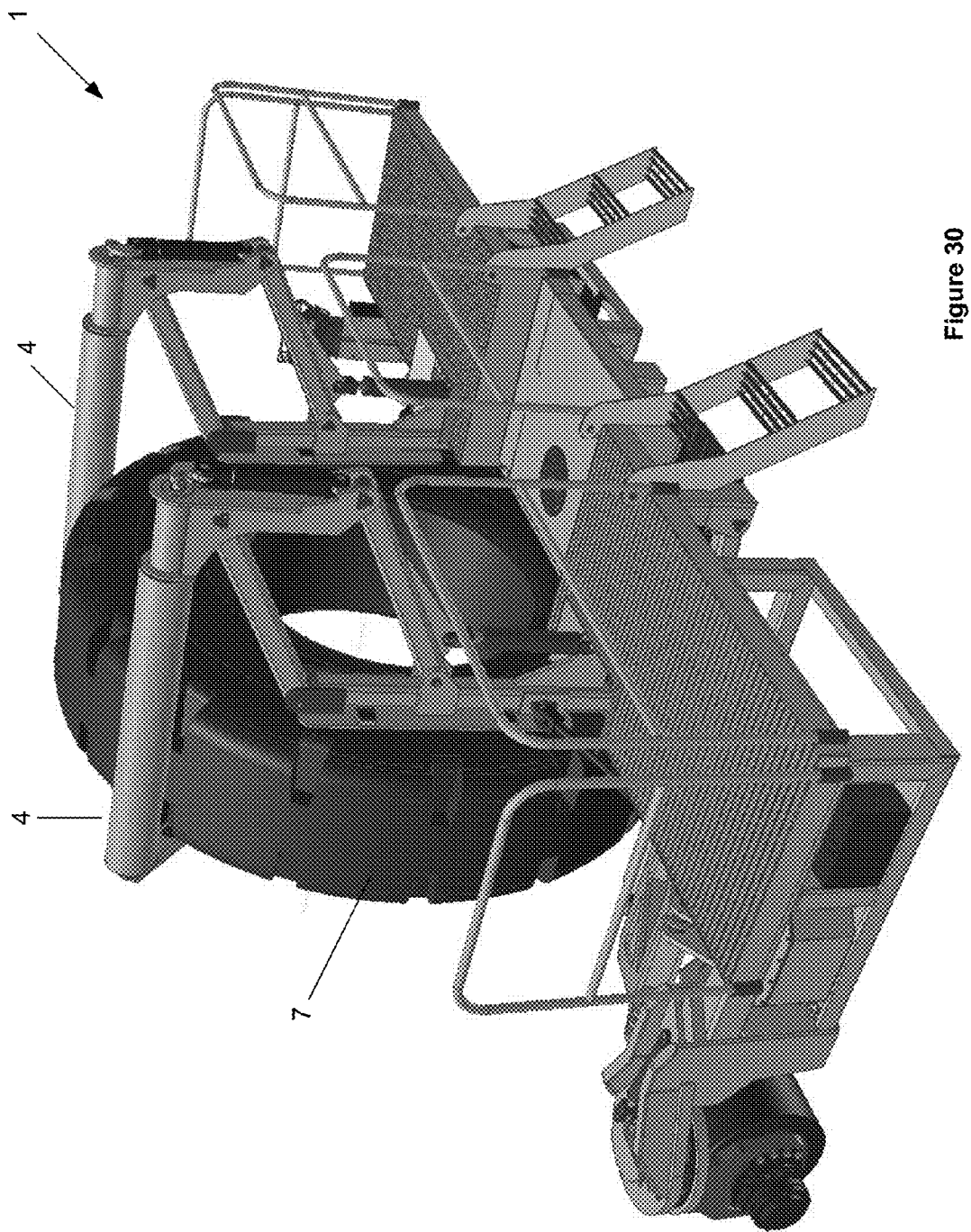
FIG. 30 illustrates a rear perspective view of the apparatus shown in FIG. 29.
Figure 31:
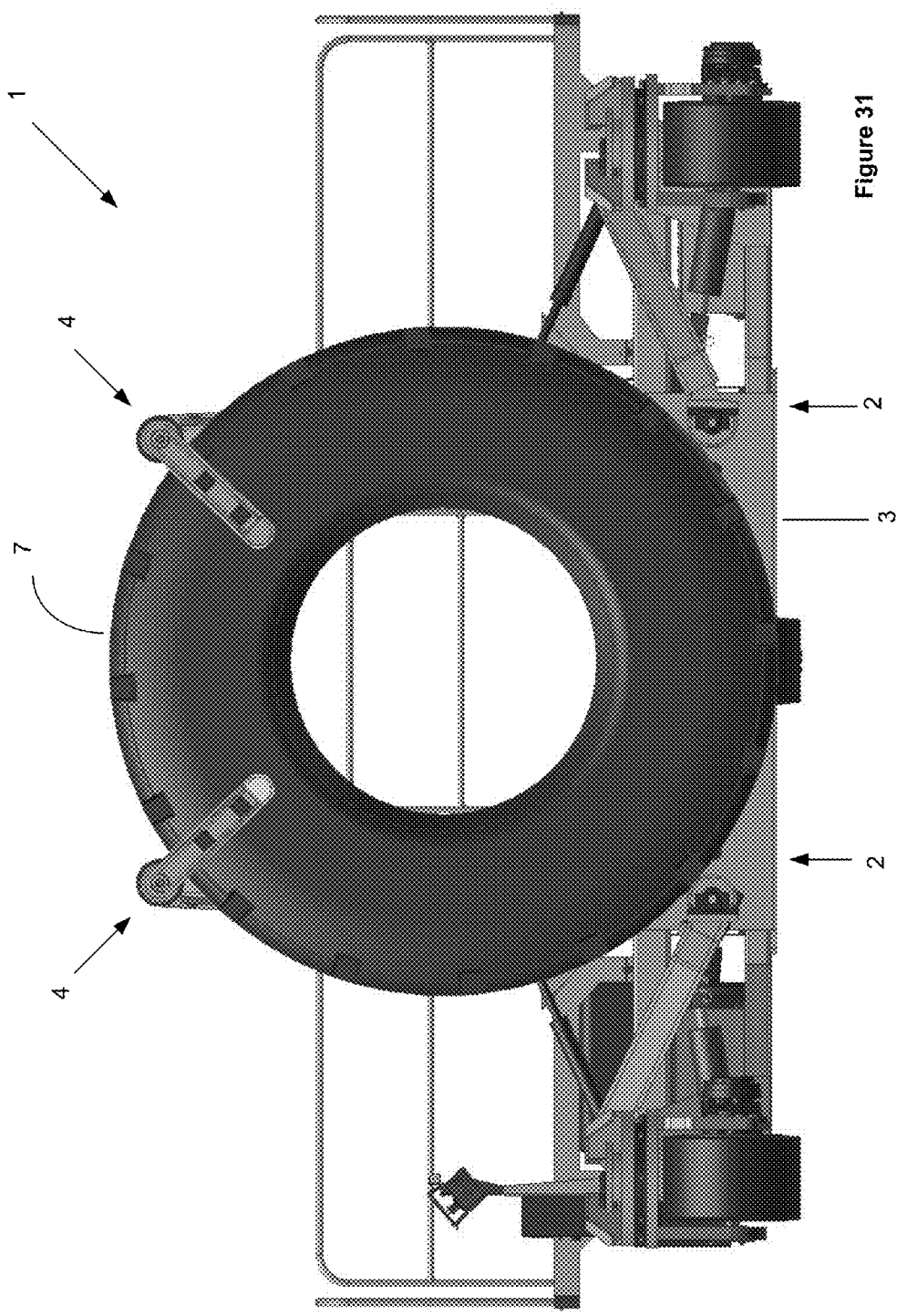
FIG. 31 illustrates a front perspective view of the apparatus shown in FIG. 29.
Figure 32:
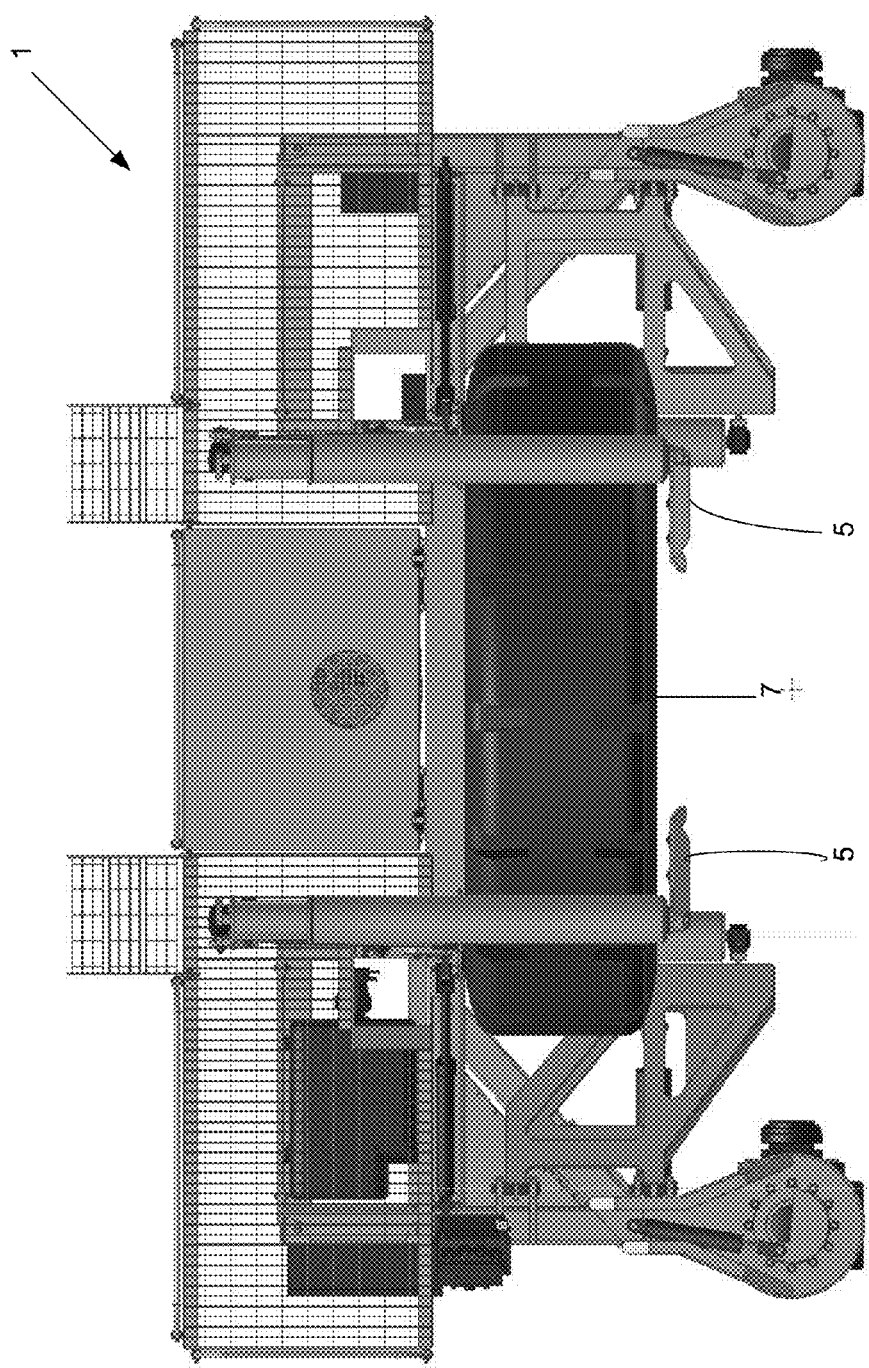
FIG. 32 illustrates a top view of the apparatus shown in FIG. 29.

The claw-like end portions (5) are able to rotate from an approximate position parallel to the upright portions (8) of the retaining arms (4) to a position greater than 90 degrees from the upright portions (8). This enables positioning of the claw-like end portions (5) behind the tyres. FIGS. 14 and 15 show the claw in both retracted, and extended/engaging positions.

In one example this is achieved by attaching the claw to an extended shaft and then connecting the shaft to a dog-bone arm attached to a hydraulic cylinder.

The retaining arms (4) are hingedly connected to the frame and, thereby tilt relative to the frame (3) to accommodate articles of different sizes. The two uprights portions (8) act as the rear half of a tyre support clamp, the claw-like end portions providing the front half. Thus the retaining arm (4) contactingly engages both walls of the tyre to securely clamp the tyre.

Figure 10:
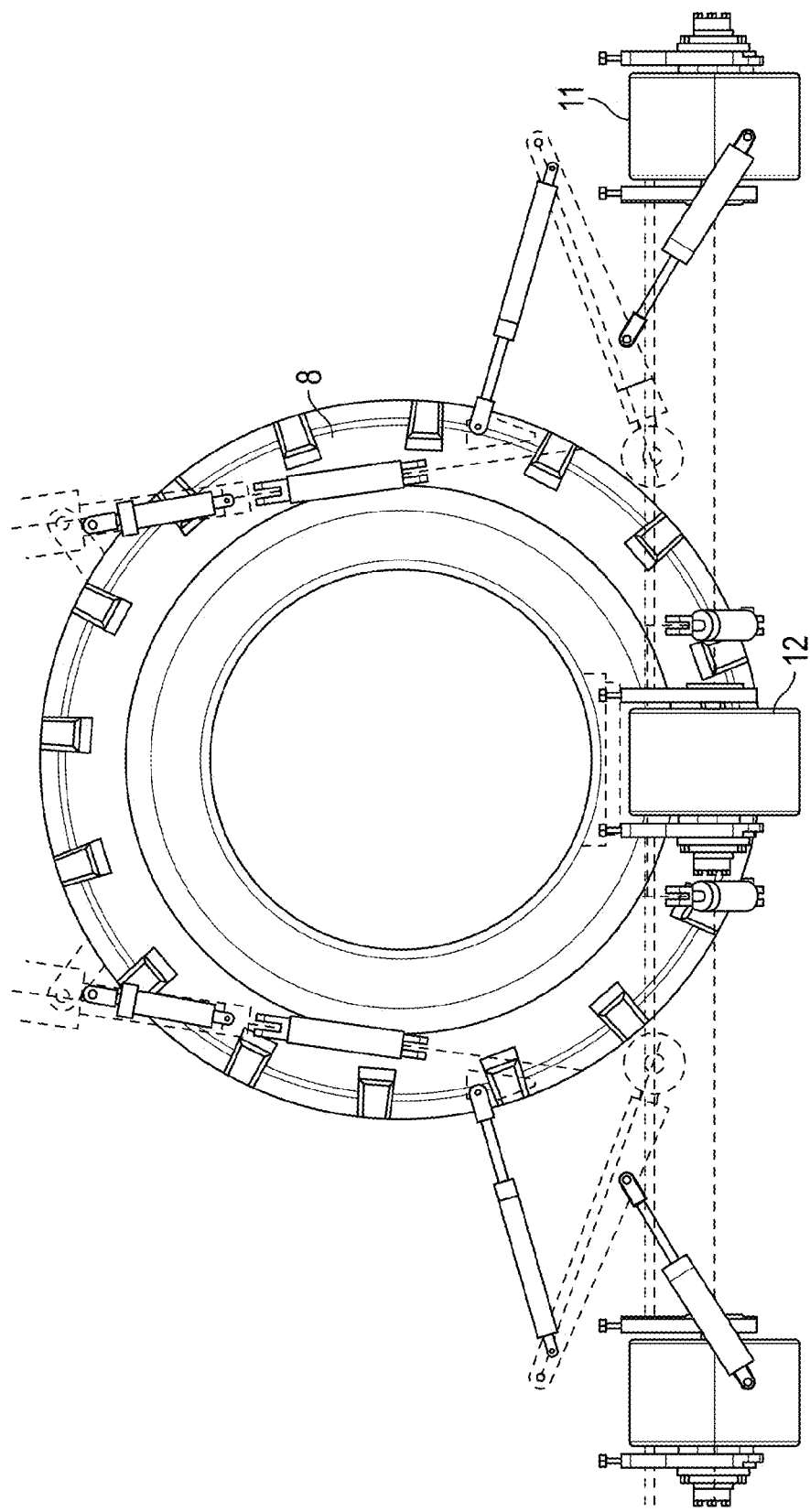
FIG. 10 is a rear view of one example of the article handling apparatus handling a small tyre.
Figure 11:
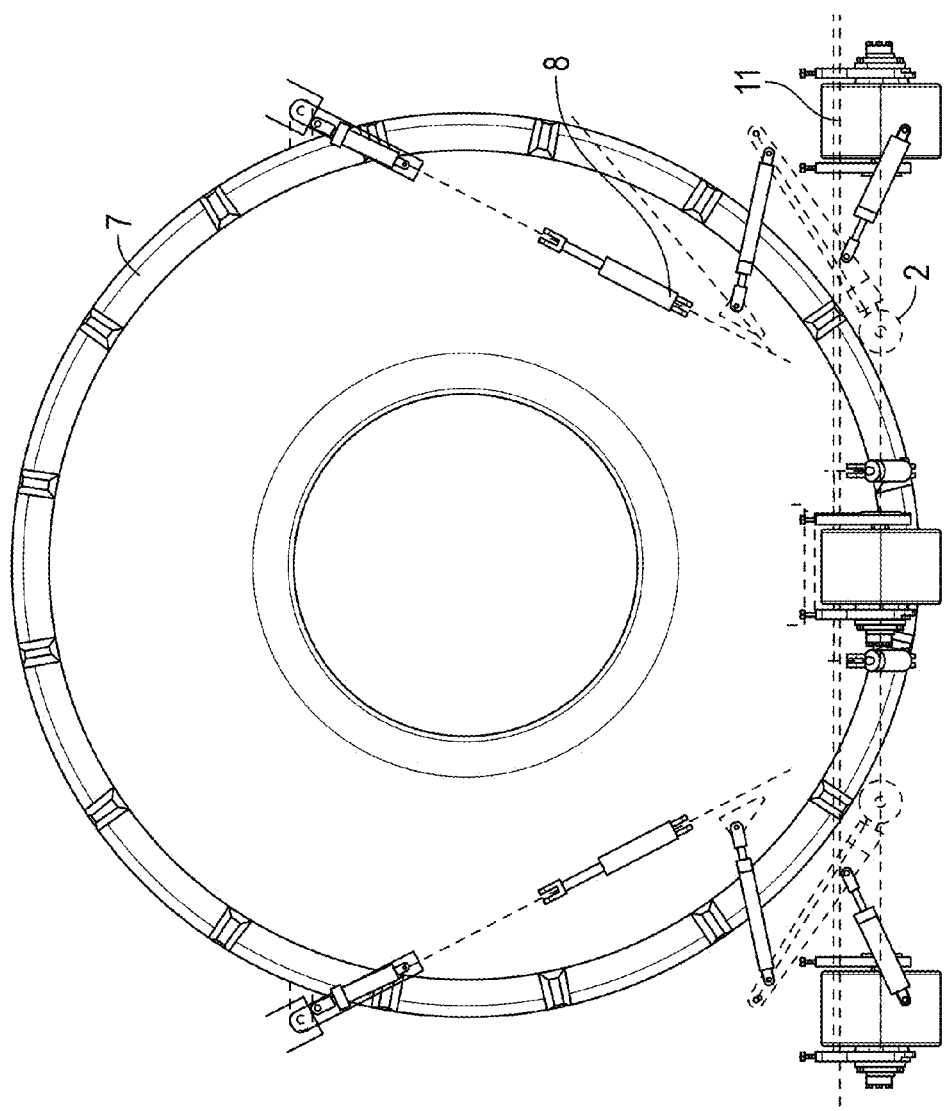
FIG. 11 is a rear view of one example of the article handling apparatus handling a large tyre.

The upright portions (8) tilt with respect to the frame (3) to provide support for different tyre sizes. The left and right upright portions can function independently as the upright portions (8) might need to be set at different angle configurations to avoid interference with different components on some vehicles. On smaller tyres the upright portions (8) will need to tilt inwards (FIG. 10), while on larger vehicles the upright portions (8) of the retaining arms (4) will need to tilt outwards (FIG. 11).

In one example the tilt is controlled by a hydraulic cylinder. Motors, pneumatics or other alternative means may instead be used, as will be understood by a person skilled in the art.

The apparatus (1) has two front wheels (11) and a rear wheel (12), the rear wheel (12) capable of moving independent of the two front wheels (11). For example, the apparatus has the option to have rear drive only and also the option of combined full drive where all 3 drive wheel can act in unison. By turning front and rear to the steering limits (ie 90 deg) side shift travel may be achieved by driving all 3 wheels at the same rate. Thus the apparatus (1) may be driven with all wheels in a parallel direction allowing side travel or alternatively the rear may be steered independently allowing the vehicle to turn in a tight circle for its footprint.

In one example a turntable and dog bone attached to a cylinder (or slew drive) is to be connected to each drive yoke allowing horizontal rotation about its vertical centre axis. The rotation of this arrangement may be 135 deg (nom).

The supporting arms (2) include rollers to allow rotation of the secured article (7). The rollers (13) contact the tyre tread and the rotation of the roller against the tyre (7) causes the tyre (7) to rotate about its centre. The roller allows rotation of tyre assemblies for alignment onto flange supports. The roller length is sufficiently long to support the full length of a Cat777 tyre (OD 2340 mm, width 750 mm) and may be repositioned to support wider or narrower tyres. This may be achieved by the supporting arms (2) including telescopic tubing, thereby allowing manual extension or retraction along the length of the telescopic tube.

In some examples the retaining arms (4) may also include rollers to facilitate rotation of the tyre (7). In one example the rollers are controlled by a hydraulic motor and gearbox assembly attached to the roller.

The left and right supporting arms (2), complete with rollers (13), are able to raise and support the tyre assemblies. This lift function may be separated by left and right lift or a combined lift by using both controls in unison. These supporting arms may be raised by a hydraulic cylinder.

Figure 8:
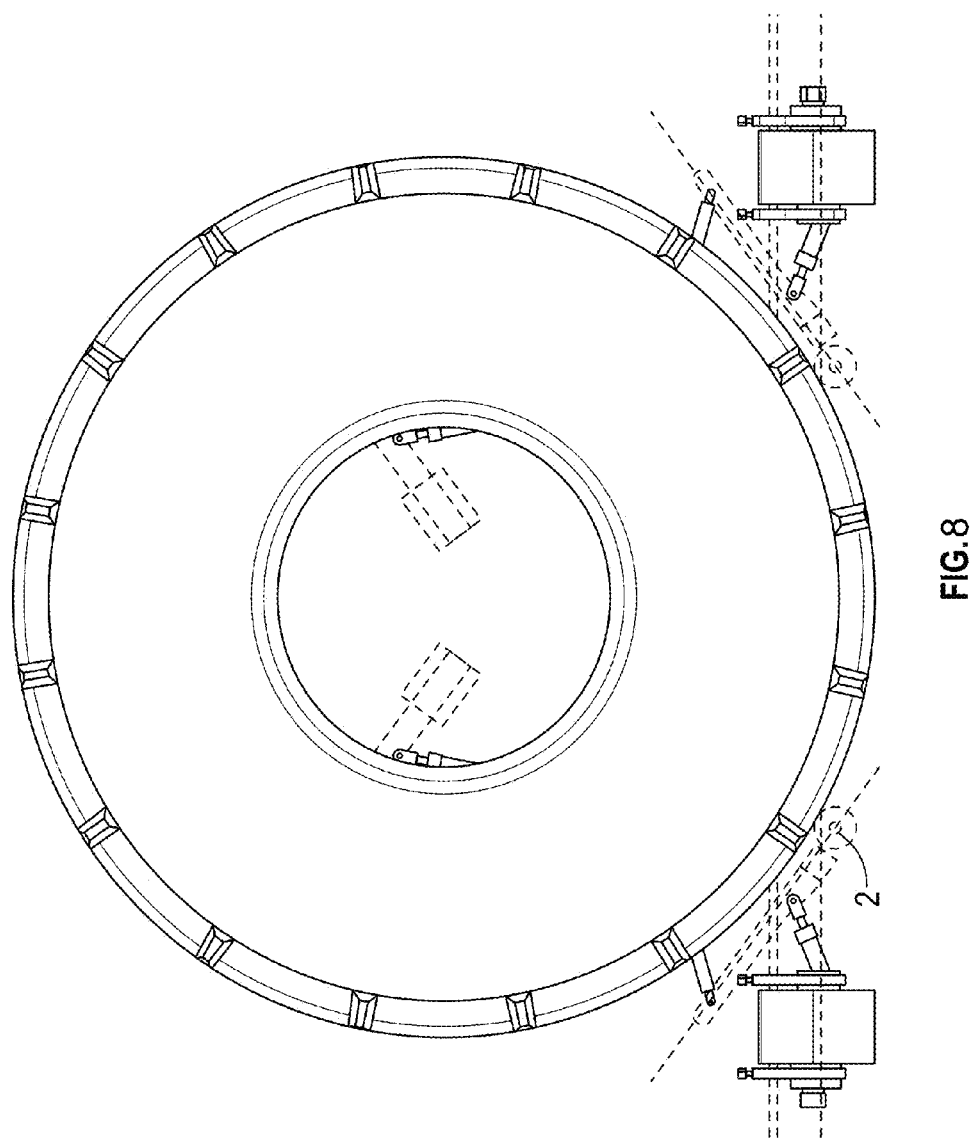
FIG. 8 is a front view of one example of the article handling apparatus handling a large tyre.
Figure 9:
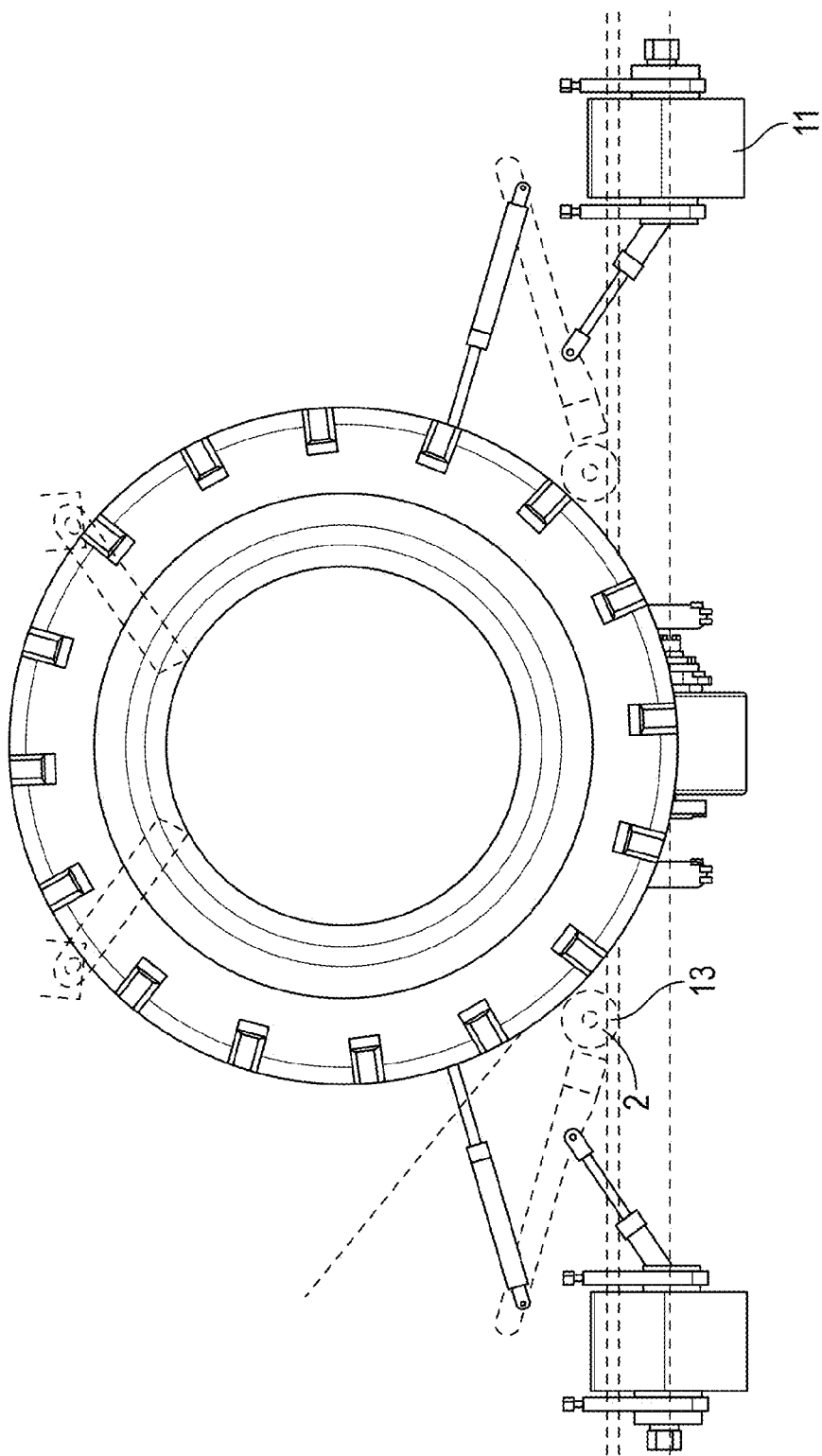
FIG. 9 is a is a front view of one example of the article handling apparatus handling a small tyre.

In one example the travel of the supporting arms needs to be low enough to clear under a large tyre (for example a Letorneau L1850, OD:4200 mm, width:1500 mm) when it is on the ground (FIG. 8) but travel high enough to raise a small tyre (eg: Cat777, OD:2340, width 750 mm) tyre to a reasonable working height (FIG. 9).

Figure 6:
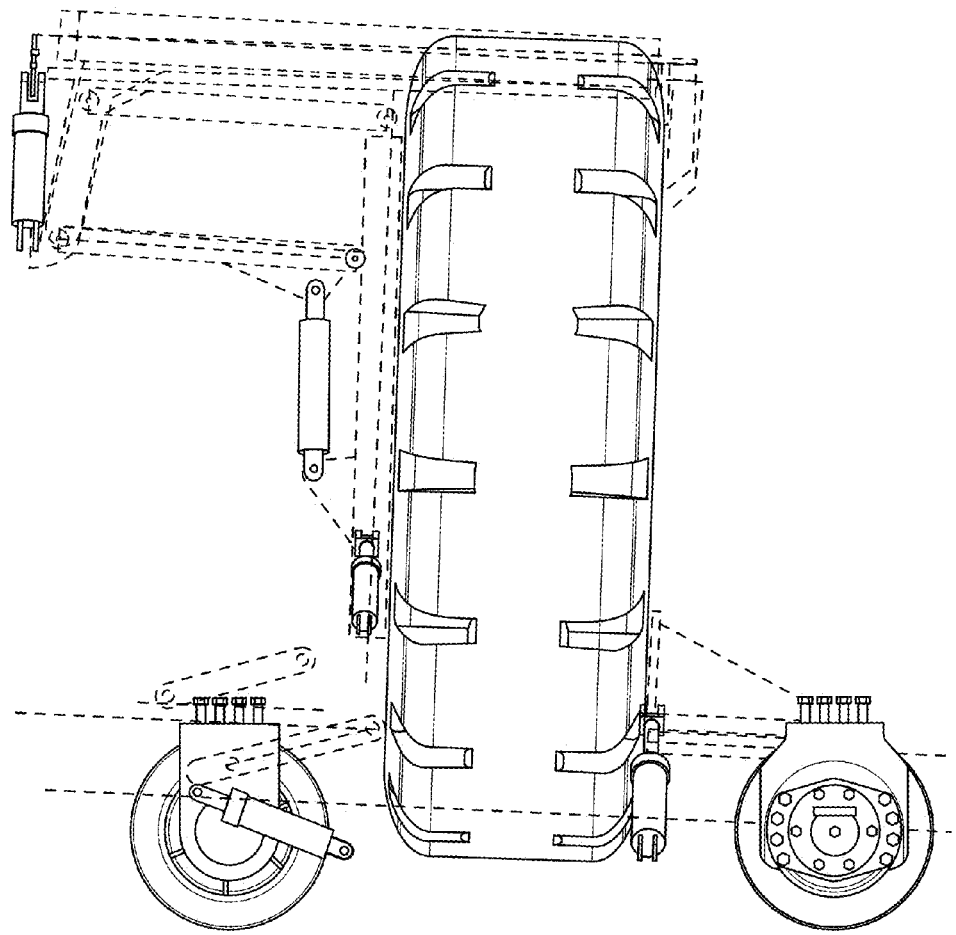
FIG. 6 is a side view of one example of the article handling apparatus showing article tilted forward.
Figure 7:
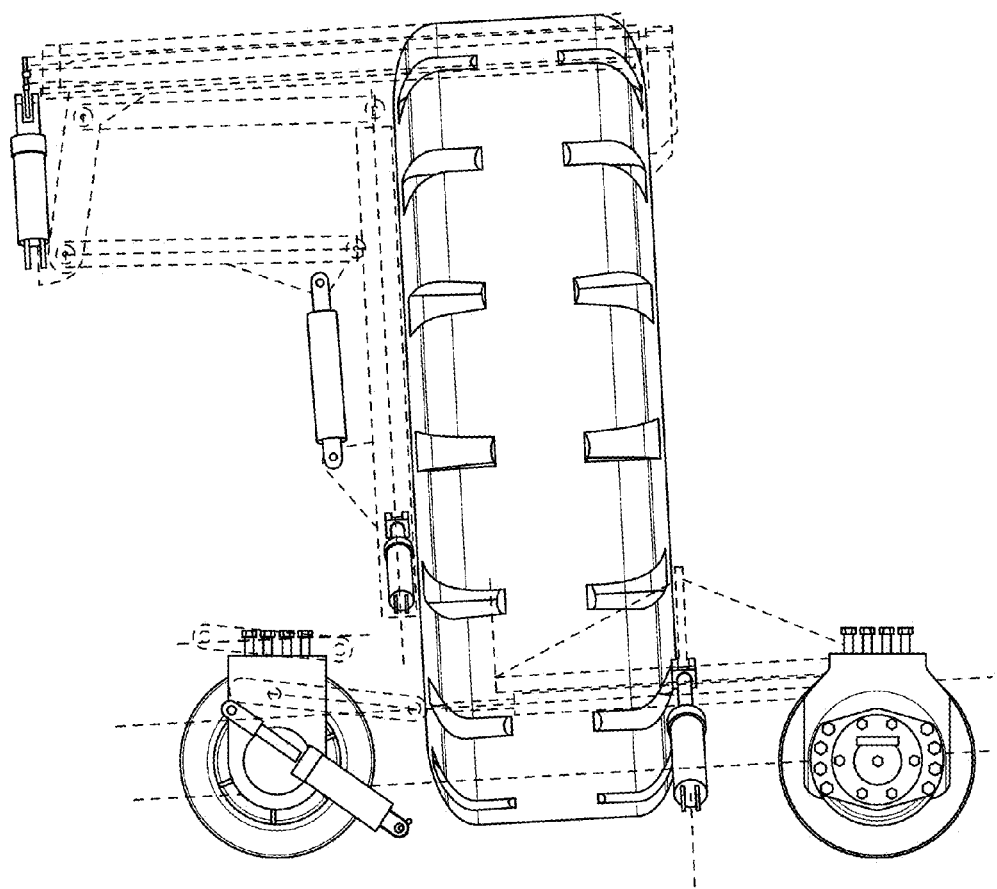
FIG. 7 is a side view of one example of the article handling apparatus showing article tilted rearward.

The article handling apparatus (1) includes at least one tilting arm (14) operatively coupled to the rear wheel, the tilting arm operating to tilt the secured article forward and rearward. For example when the article is a tyre as in FIGS. 1 to 15, front to rear tilt may be required to align the tyre to a wheel axis' that may not be parallel to the horizontal. FIGS. 6 and 7 show forward and rearward tilting.

In one example frontward and rearward tilt is to be achieved by a set of trailing arms attached to the rear wheel. These trailing arms are attached to a hydraulic cylinder that will typically raise the chassis +4/−2 deg (nom) from horizontal.

Figure 3:
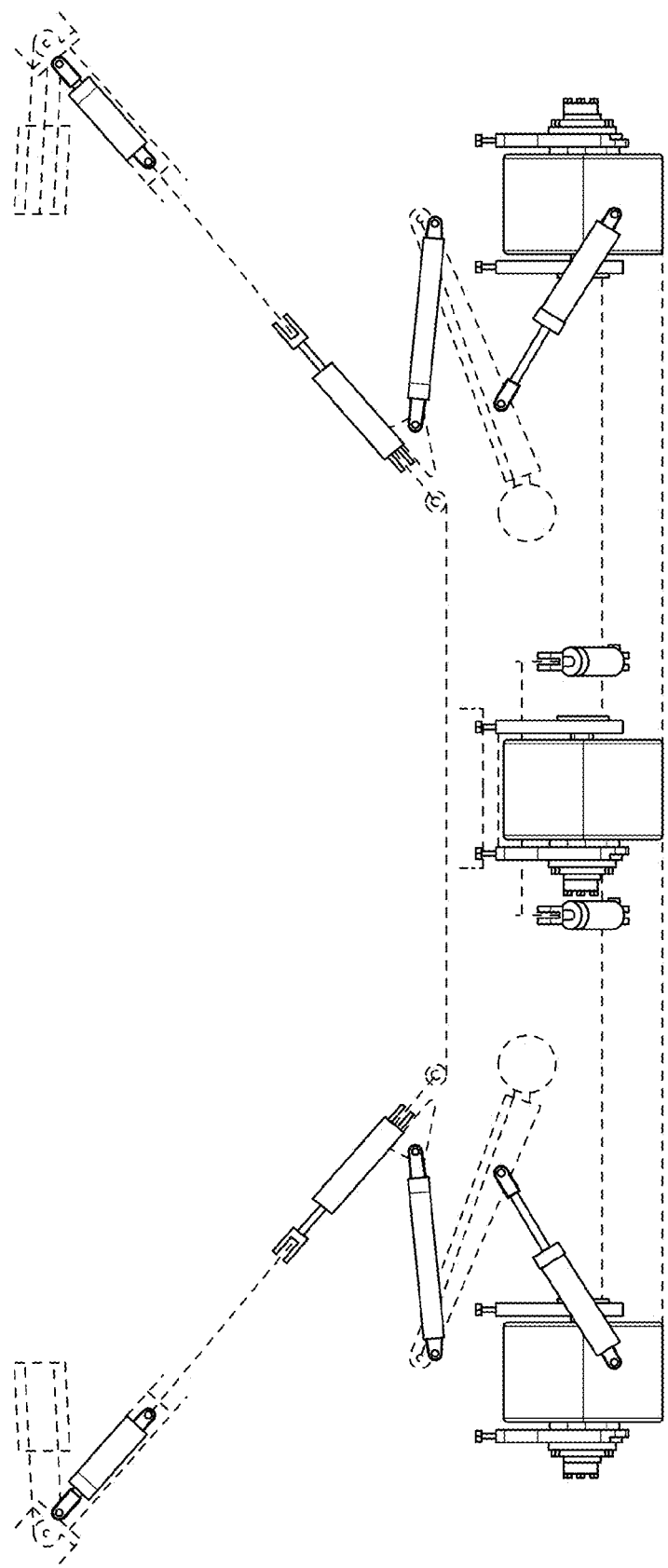
FIG. 3 is a rear view of one example of the article handling apparatus retracted to fit in a standard shipping container envelope.
Figure 4:
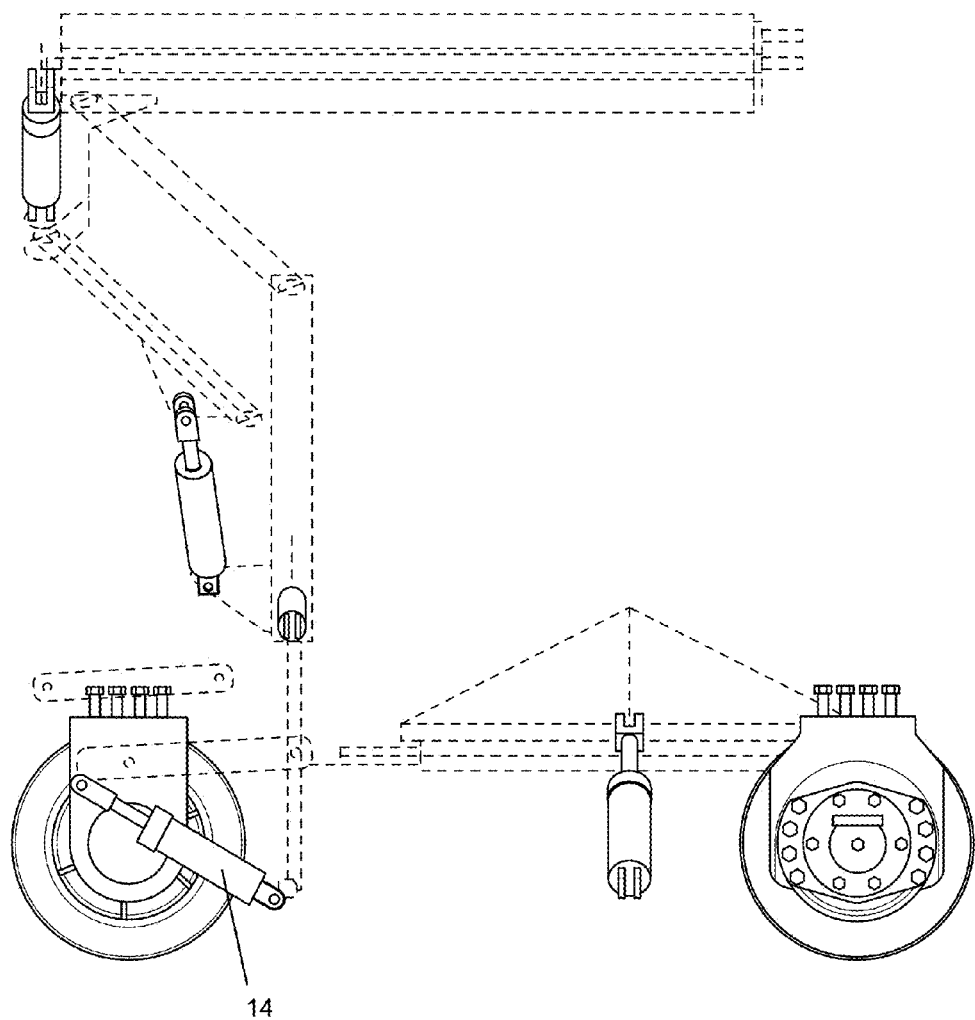
FIG. 4 is a side view of one example of the article handling apparatus retracted to fit in a standard shipping container envelope.
Figure 5:
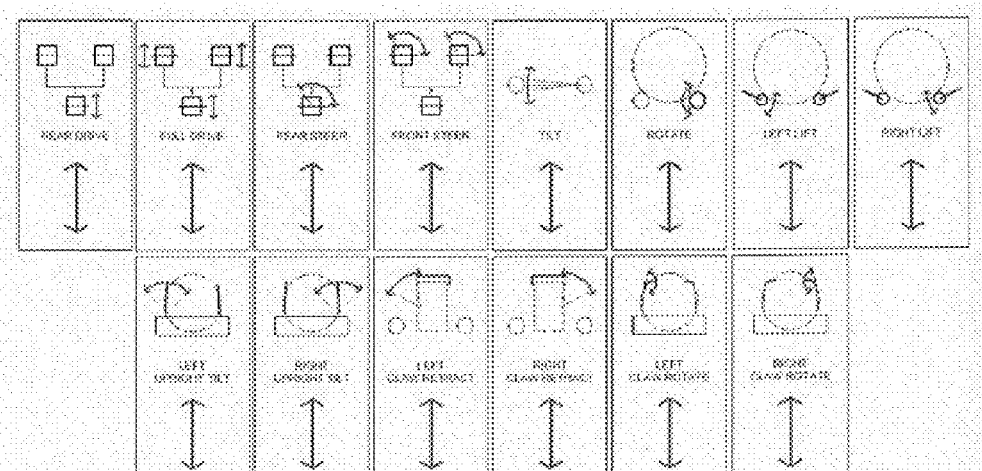
FIG. 5 is a table indicating different modes of operation of one example of the article handling apparatus.

According to one example, the present invention provides a 3 driven wheel vehicle that will consist of a range of hydraulic arms and components that will raise and lower tyres, rotate secured tyres about their axis by a driven roller; stabilise the front and rear of the tyre by a hydraulic clamp support mechanism and tilt forward or backward by raising and lowering a set of rear trailing arms to allow parallel alignment with the tyres axle. In addition to these requirements the tyre handler is able to retract so that it can fit Within a standard shipping container. The tyre handler has the functionality of drive, steer, tilt, rotate, lift, upright tilt, claw retract, claw rotate. These functions can be broken down further to separate left and rear or front and rear to present a control panel similar to the one represented in FIG. 5. As shown in FIGS. 3 and 4, the tyre handler may be retracted within the 2330×2280 shipping container envelope.

FIGS. 17 to 32 illustrate another embodiment of the invention. Specifically, FIGS. 17 to 23 show the article handling apparatus in various views, without showing the article itself being supported, whilst FIGS. 24 to 28 show a large tyre being handled, and FIGS. 29 to 32 show a smaller tyre being handled by the same apparatus.

Referring to the embodiment shown in FIGS. 17 to 32, the article handling apparatus 1 includes a support means in the form of a pair of supporting arms 2 extending from a frame 3, two retaining arms 4 extending upwardly from the frame 3 having claw like end portions 5 which are configured to extend about the article 7 shown in FIGS. 24 to 32. It will be understood that the article 7 is thereby able to be securely clamped to the frame 3. To remove the article 7, the claw like end portions 5 may be retracted/rotated, as desired.

It will be appreciated from viewing FIGS. 17 to 32 that either extremely large tyres, such as shown in FIGS. 24 to 28, or smaller tyres such as shown in FIGS. 29 to 32 may be supported by the apparatus 1. In the embodiment shown in FIGS. 17 to 32, as opposed to the embodiment shown in FIGS. 1 to 16, the article does not necessarily need to be tilted in the event that the frame is stable by the provision of the wheels extending on either side of the apparatus.

The apparatus 1 has three wheels for movement of the apparatus over a substrate surface. Each wheel may be independently driven, by a controller. The controller may be either provided in situ on the apparatus, or, may be remotely controlled. Suitable electronic and/or hydraulic cylinders or other drive means may be utilised for movement of each of the component parts, rotation of the wheels, etc. It will be appreciated by the provisional of the three wheels, the apparatus 1 may be moved on a very small footprint.

The supporting arms 2 include rollers which allow for rotation of the tyre 7 or other article. Rotation of the rollers 13 by their contact with the tyre tread permit the tyre to rotate. This is useful in servicing and in installation removal of the tyre from a vehicle. The rollers may be controlled by hydraulic or electric motors. The left and right supporting arms, together with their rollers 13 are adapted to raise and support the tyre. This lift function may be performed separately on the left and right supporting arms, or, they may be controlled in unison to raise, lower, rotate and reangle the article supported. It will be appreciated that the article handling apparatus of the present invention has a number of unique advantages over the known prior art which facilitates easy removal or installation of a tyre from a vehicle. The type may be easily manipulated in a wide variety of angles, elevations, etc which facilitate servicing of the tyre and its associated vehicle. The apparatus of the present invention may be positioned adjacent the wheel of a vehicle to be serviced. The wheel may be secured or clamped by the apparatus, then detached from the vehicle to be serviced, without requiring any physical interaction by a person. The apparatus, containing the wheel may then be repositioned for servicing the wheel, and then the wheel, or a new wheel, may be replaced on the vehicle by simply repositioning the apparatus and resecuring the wheel. The low slung configuration of the article handling apparatus 1 of the present invention permits its provision and removal in a tightly confined space for example, in a mining situation. As shown in FIGS. 17 to 32, the apparatus may further include a working platform together with access ladders which enable service personnel good access to the article being handled.

Finally, it can be understood that the inventive concept in any of its aspects can be incorporated in many different constructions so that generality of the preceding description is not superseded by the particularity of the attached drawings. Various alterations, modifications and/or additions may be incorporated into the various constructions and arrangements of parts without departing from the spirit or ambit of the present invention.

The invention claimed is:

1. An article handling apparatus including:
    a frame adapted to receive the article on a support means;
    a plurality of wheels attached to said frame for movement of said frame over a substrate surface; and
    a plurality of retaining arms, each including a substantially upright portion operatively coupled to a claw-like end portion, the retaining arms being operatively coupled to the frame and adapted to releasably secure the article to the frame;
    wherein the secured article is movable in a controlled manner with respect to the frame by movement of the support means and the retaining arms, wherein the upright portions of the retaining arms are extendable and hingedly connected to the frame, and thereby extend in length and tilt relative to the frame to accommodate articles of different sizes.

2. An article handling apparatus as claimed in claim 1 wherein the support means includes a pair of supporting arms extending from the frame.

3. An article handling apparatus as claimed in claim 2 wherein the supporting arms are hingedly connected to the frame.

4. An article handling apparatus as claimed in claim 1 wherein the upright portions of the retaining arms extend substantially upwards from the frame and the claw-like end portions of the retaining arms are configured to extend over the article and clamp the article securely to the frame.

5. An article handling apparatus as claimed in claim 4 wherein the claw-like end portions are retractable or rotatable to permit the article to be removed.

6. An article handling apparatus as claimed in claim 1 wherein the apparatus includes two front wheels and a rear wheel, the rear wheel being movable independent of the two front wheels.

7. An article handling apparatus as claimed in claim 1 wherein each retaining arm and the support means includes rollers to allow rotation of the secured article.

8. An article handling apparatus as claimed in claim 1 wherein the article handling apparatus includes at least one tilting arm operatively coupled to a rear wheel and to the frame, the tilting arm operating to raise and lower the rear wheel to thereby tilt the secured article forward and rearward.

9. An article handling apparatus as claimed in claim 1 configured to handle a tyre.

10. An article handling apparatus as claimed in claim 9 wherein the retaining arms are configured to contactingly engage both walls of the tyre to securely clamp the tyre.

11. An article handling apparatus as claimed in claim 9 wherein each retaining arm and the support means includes rollers, wherein the rollers contact the tyre tread to rotate the tyre.

12. An article handling apparatus as claimed in claim 1 wherein the support means is configured to be movable relative to the frame to thereby raise and lower the article.

13. An article handling apparatus as claimed in claim 1 wherein the supporting means includes two rollers each connected to the frame by a supporting arm, wherein the supporting arms are hingedly connected to the frame, whereby pivoting the supporting arms raises or lowers the rollers to thereby raise or lower the article.

14. An article handling apparatus as claimed in claim 13 wherein the supporting arms can be pivoted individually.

15. An article handling apparatus as claimed in claim 1, wherein the retaining arms are movable independently of one another.

16. An article handling apparatus as claimed in claim 1, wherein the claw-like end portions are connected to the upright portions of the retaining arms by parallel arms that form a parallel linkage to permit the claw-like end portion to be moved relative to the upright portion while maintaining a constant orientation.

17. An article handling apparatus as claimed in claim 1 wherein the retaining arms are tiltable about two different axes.

18. An article as claimed in claim 1 further including a platform for an operator to stand on.

19. An article as claimed in claim 18, further including a ladder for the operator to access the platform.

* * * * *